United States Patent
Futamoto et al.

(10) Patent No.: US 6,383,667 B1
(45) Date of Patent: May 7, 2002

(54) MAGNETIC RECORDING MEDIUM

(75) Inventors: Masaaki Futamoto, Shiroyama; Nobuyuki Inaba, Hasuda; Yoshiyuki Hirayama, Kodaira; Teruaki Takeuchi, Moriya; Yukio Honda, Fuchu, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/413,813

(22) Filed: Oct. 7, 1999

(30) Foreign Application Priority Data

Oct. 9, 1998 (JP) .......................................... 10-288134
Feb. 24, 1999 (JP) .......................................... 11-045884

(51) Int. Cl.$^7$ .............................. G11B 5/66; G11B 5/70
(52) U.S. Cl. ........................ 428/694 TS; 428/694 TM; 428/694 TP; 428/336
(58) Field of Search ..................... 428/694 TS, 694 TP, 428/694 TW, 900, 336

(56) References Cited

U.S. PATENT DOCUMENTS

| | | | | |
|---|---|---|---|---|
| 5,543,221 A | * | 8/1996 | Kitakami et al. | 428/332 |
| 5,800,931 A | * | 9/1998 | Lee et al. | 428/611 |
| 5,820,963 A | * | 10/1998 | Lu et al. | 428/65.3 |
| 5,849,386 A | * | 12/1998 | Lal et al. | 428/65.3 |
| 5,851,643 A | * | 12/1998 | Honda et al. | 428/212 |
| 6,001,447 A | | 12/1999 | Tanahashi et al. | 428/65.3 |

FOREIGN PATENT DOCUMENTS

| | | |
|---|---|---|
| JP | 4-321919 | 11/1992 |
| JP | 07-057233 | 3/1995 |
| JP | 10-233016 | 9/1998 |
| JP | 10-334444 | * 12/1998 |

OTHER PUBLICATIONS

Journal of Magnetism and Magnetic Materials, vol. 155, 1996, "Design and Crystallography of Multilayered Media", D. Laughlin et al, pp. 146–150.

Journal of Applied Physics, vol. 79, No. 8, 1996, "Magnetic and Crystallographic Properties of CoCrPt thin films formed on Cr–Ti single crystalline under layers", N. Inaba et al, pp. 5354–5356.

* cited by examiner

Primary Examiner—Paul Thibodeau
Assistant Examiner—Holly C. Rickman
(74) Attorney, Agent, or Firm—Mattingly, Stanger & Malur, P.C.

(57) ABSTRACT

A magnetic recording medium includes a substrate, an underlayer provided on the substrate, a Co alloy magnetic film formed through the underlayer, and a protective film for protecting the magnetic film, wherein the underlayer has a two-layer structure of an lower underlayer contacted with the substrate and an upper underlayer contacted with the Co alloy magnetic film, the upper underlayer is a Co—$Cr_x$—$M_y$ alloy film having a hexagonal close-packed structure, where 25 atomic %$\leq$x+y$\leq$50 atomic %, 0.5 atomic %$\leq$y, non-magnetic element M is one selected from the group of elements B, Si, Ge, C, Al, P, Ti, V, Nb, Zr, Hf, Mn, Rh, Os, Ir, Re, Pd, Pt, Mo, Ta, W, Ag and Au. Thereby the medium can be increased in its coercive force and can be improved in its thermal stability characteristics.

14 Claims, 8 Drawing Sheets

MAGNETIC RECORDING MEDIUM

BACKGROUND OF THE INVENTION

1. Field of the Invention

The present invention relates to a magnetic recording medium which has a magnetic film suitable for high-density magnetic recording.

2. Description of the Related Art

Magnetic disk devices so far put in practical use employ a longitudinal magnetic recording system. The longitudinal magnetic recording system is a recording system wherein a longitudinal domain parallel to a disk substrate is formed on a magnetic recording medium which can be easily magnetized in a direction parallel to the plane of the substrate, and the recording density of the longitudinal magnetic recording is being increased. An increase in the recording density is achieved mainly by improving a coercive force and decreasing the thickness of a magnetic film.

For the purpose of improving the coercive force of a magnetic film of Co alloy, there is employed a method for providing such a material having a body-centered cubic (bcc) structure as Cr or Cr alloy or providing an underlayer having a B2 type crystal structure such as NiAl between a magnetic film and a substrate (see David E. Laughlin. Y. C. Feng. David N. Lambeth, Li-Lien Lee, Li Tang, "Design and crystallography of multilayered media" in Journal of Magnetism and Magnetic Materials, Vol. 155, pp. 146–150, 1996).

When an underlayer of the bcc structure is employed, it is effective in further improving the coercive force to match lattice constant conditions of a Co alloy magnetic film to be epitaxially grown with those of the underlayer. (For example, refer to a U.S. literature (N. Inaba, A. Nakamura, T. Yamamoto, Y. Hosoe, M. Futamoto, "Magnetic and crystallographic properties of CoCrPt thin films formed on Cr—Ti single crystalline underlayers" in Journal of Applied Physics, Vol. 79, No. 8, pp. 5354–5356, 1996).

For improving the coercive force, it is further effective to improve the crystallographic quality of the Co alloy magnetic film. To this end, it is effective to add a new underlayer of nonmagnetic material of a hexagonal close-packed (hcp) structure (which will be referred to merely as the hcp structure, hereinafter) having the same crystalline structure as the Co alloy magnetic film between the underlayer and magnetic film (for example, refer to JP-A-4-321919). Usable as the underlayer to be added for a Co—Cr—Pt magnetic film as one of the typical magnetic films is, for example, a Co film containing 35 atomic % of Cr, that is, a Co-34 at. %Cr (for example, refer to M. Futamoto, Y. Honda, Y. Hirayama, K. Itoh, H. Ide, Y. Maruyama, "High Density Magnetic Recording on Highly Oriented CoCr-Alloy Perpendicular Rigid Disk Media" in IEEE Transactions on Magnetics, Vol. 32, No. 5, pp. 3789–3794, 1996).

In view of these literatures, the recording density of the longitudinal magnetic recording medium reaches currently 10 Gb/in$^2$. In order to obtain a recording density exceeding 10 Gb/in$^2$, it becomes necessary to additionally increase the coercive force and also to enhance the thermal stability characteristics. The improvement of the recording density requires the decrease of the thickness of the magnetic film, as mentioned above. However, when the film thickness is too small, this involves such a problem that thermal influence results in decrease of recording magnetization with time, leading in some cases to disappearance of the magnetization. The influence by such thermal stability of the magnetization becomes remarkable when the magnetic film is a Co alloy-based magnetic film often used in the magnetic disk device and when the thickness of the magnetic film is usually 20 nm or less.

Based on the conventional method for improving a recording density, it is considered that, in order to realize a recording density of 10 Gb/in$^2$ or more, the magnetic film has to have a thickness of 20 nm or less and thus its thermal influence cannot be avoided.

SUMMARY OF THE INVENTION

It is therefore an object of the present invention to provide a novel magnetic recording medium which can realize a high recording density of 10 Gb/in$^2$ or more and can be put in practical use, by increasing a coercive force and improving thermal stability characteristics.

As a result of having examined thermal stability characteristics of a longitudinal magnetic recording medium, it has been found that a region having a deteriorated crystallographic quality with a low magnetic anisotropy energy is formed on a part of a magnetic film, and the deterioration of the crystallographic quality expands from the region to promote decrease of the recording magnetization. Further, the deteriorated crystallographic quality part has a low magnetic anisotropy energy and the magnetic anisotropy energy is used to form the coercive force of the medium, so that existence of a region having a deteriorated crystallographic quality results in reduction of the medium coercive force, that is, decrease in the recording magnetization. Accordingly it is important to block formation of such a deteriorated crystallographic quality region.

From the aforementioned viewpoint, when Co alloy material most generally used in a longitudinal magnetic recording medium and having the hcp structure in discussion is examined, it has been found that a region having a low crystallographic quality is present in an initial growth region of a magnetic film, and the crystallographic quality of the region is strongly affected by an underlayer contacted with the magnetic film. Therefore, it is clearly important to set the structure and composition of the underlayer in such a manner as to provide a good crystallographic quality for the magnetic film.

As a result of having paid attention to and examined a magnetic-film formation process, it has also been found that, when at least one very thin layer having a composition different from that of the magnetic film is introduced in the magnetic-film formation process, the magnetic anisotropy energy of crystalline grains forming the magnetic film can be increased.

The present invention is based on the aforementioned consideration and examination results. In accordance with an aspect of the present invention, the above object is attained by providing a magnetic recording medium featured in that an underlayer has a two-layer structure of a lower underlayer contacted with a substrate and an upper underlayer contacted with a Co alloy magnetic film, the upper underlayer is a Co—Cr$_x$—M$_y$ alloy film having a hexagonal close-packed (hcp) structure, where an addition concentration of Cr+nonmagnetic element M satisfies a relationship of 25 atomic %$\leq$x+y$\leq$50 atomic %, an addition amount of the element M satisfies a relationship of 0.5 atomic %$\leq$y, and the element M is one selected from the group of elements B, Si, Ge, C, Al, P, Ti, V, Nb, Zr, Hf, Mn, Rh, Os, Ir, Re, Pd, Pt, Mo, Ta, W, Ag and Au. In addition, the upper underlayer has feature such that the alloy film has the hcp structure of Co—Ru$_x$—Cr$_y$ (5 atomic %<x$\leq$65 atomic %, 35 atomic %$\geq$y$\geq$9 atomic %).

Further, in accordance with another aspect of the present invention, there is provided a magnetic recording medium featured in that a Co alloy magnetic film is separated by at least one very thin film of Co—$Cr_x$—$M_y$ alloy having a hexagonal close-packed structure, an addition concentration of Cr+M satisfies a relationship of 25 atomic %$\leq$x+y$\leq$50 atomic %, an addition amount of M satisfies a relationship of 0.5 atomic %$\leq$y, nonmagnetic element M is one selected from the group of elements B, Si, Ge, C, Al, P, Ti, V, Nb, Zr, Hf, Mn, Rh, Os, Ir, Re, Pd, Pt, Mo, Ta, W, Ag and Au.

In longitudinal magnetic recording, the material of the magnetic film of media most often used and studied so far is Co alloy having a hexagonal close-packed (hcp) structure. In a Co alloy-based longitudinal magnetic recording medium, a region having a low crystallographic quality is present in an initial film growth region. The crystallographic quality of this part is strongly affected by its underlayer. The present invention is featured in that the underlayer has a structure of at least two layers, and an upper underlayer contacted with the magnetic film is made of a selected material.

DESCRIPTION OF THE EMBODIMENTS

Embodiments of the present invention will be explained with reference to accompanying drawings.
<Embodiment 1>

Figure 1:
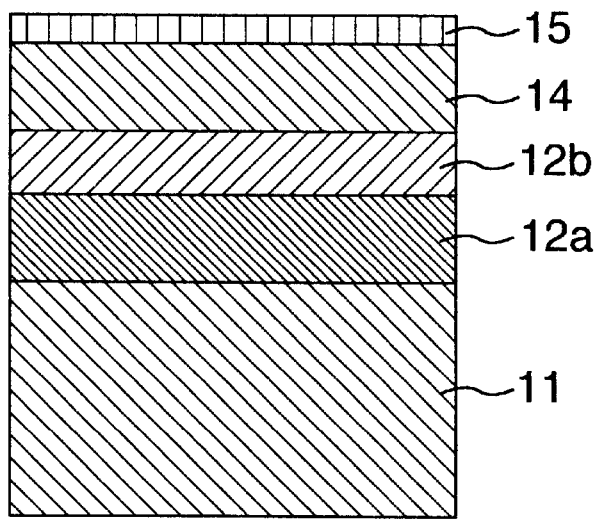
FIG. 1 is a cross-sectional view of a magnetic recording medium in accordance with an embodiment of the present invention.

FIG. 1 shows an example of a cross-sectional structure of a magnetic recording medium in accordance with a first embodiment. A lower underlayer 12a is formed on a nonmagnetic substrate 11. The lower underlayer 12a is used to epitaxially grow the crystal of a magnetic film and to control the orientation and grain size of the crystal. Such a lower underlayer 12a may preferably be made of a material having a B2 type crystal structure of an NiAl, FeAl, FeV, CuZn, CoAl or CuPd ordered phase; or a material having a bcc structure of Cr, Cr—Ti, Cr—Mo, Cr—W, Cr—Nb, or Cr—V; or may be a laminate of the material having the B2 type crystal structure and the material having the bcc structure.

When a film made of the aforementioned material is formed on the substrate 11, the film has a property that a (211) or (100) plane in the grown film tends to become easily oriented parallel to the substrate. Further, a distribution of crystalline grains in such a film of the material having B2 type crystal or bcc structure can be controlled by adjusting a substrate temperature or a film formation rate when the film is formed by a sputtering method or the like.

When a Co alloy film having the hcp structure is formed on the (211) or (100) oriented film, a ($10\bar{1}0$) or ($11\bar{2}0$) plane is grown parallel to the substrate 11 by the epitaxial growth. In this case, the axis of easy magnetization of the Co alloy becomes parallel to the substrate, and thus a characteristic, which a coercive force is improved and which is desirable as a longitudinal magnetic recording medium can be obtained.

Next an upper underlayer 12b of a Co—$Cr_x$—$M_y$ alloy material having the hcp structure as a nonmagnetic or weak magnetic material is formed on the lower underlayer 12a, and then a Co alloy magnetic film 14 and a protective film 15 are sequentially formed on the upper underlayer 12b.

In this connection, addition of Cr and M are set to be within a range of 25 atomic %$\leq$x+y$\leq$50 atomic %. When 25 atomic % or more of Cr and M are added to Co, the resultant material is weakly magnetized or non-magnetized. When 50 atomic % or more of Cr and M are added to Co, the resultant alloy material becomes unstable in the alloy hcp structure. Accordingly, in such Co alloys, a range in which the hcp structure of the nonmagnetic or weak magnetic material can be stably kept is 25 atomic %$\leq$x+y$\leq$50 atomic %. Further, when the amount of addition of the nonmagnetic element M satisfies 0.5 atomic %$\leq$y, the addition can be made effective.

Since the metal atom radius of Co is 1.26 angstroms and the metal atom radius of Cr is 1.28 angstroms, that is, since the metal atom radius of Co is close to that of Cr, the mean atom radius of the Co—Cr alloy becomes substantially constant nearly independently of the Cr concentration. It has been found according to experiments conducted by the inventor of this application that the mean atom radii of Co—Cr—Ta, Co—Cr—Pt, Co—Cr—Pt—Ta, Co—Cr—Pt—Ta—Nb, Co—Cr—Pt—Ta—B, etc. used for the recording magnetic film 14 are in a range of 1.265–1.290 angstroms.

Among these alloys, an alloy medium having Pt as an alloy element added to Co has a Pt mean atom radius is as large as 1.38 angstroms, the mean metal atom radius increases substantially in proportion to the added Pt amount. In the case of a high-density magnetic recording medium of a Co—Cr-based material, its Pt addition amount is within a range of 5–30 atomic %. In order to realize good epitaxial growth in the underlayer and magnetic film, it is desirable to make the mean metal atom radius of the underlayer nearly equal to that of the magnetic film.

First one of means for attaining the above in the present invention is to adjust the mean metal atom radius of the underlayer material by adding an element larger in metal atom radius than Co and Cr in the Co—Cr alloy by a suitable amount. Elements Rh, Os, Re and Hf having the same hcp crystalline structure as Co or elements Ir, Pd and Pt having a face-centered cubic (fcc) structure have metal atom radii larger than the metal atom radius of Co, have wide solid solution ranges, and thus are suitable as addition elements. An element Ti having the hcp structure and elements Au and Ag having the face-centered cubic structure are not so wide in solid solution range because these elements are 14% or more larger in metal atom radius than Co, but the elements can be solid-dissolved in a narrow range of not larger than 20% of addition amount. Metal elements suitable as addition elements other than the aforementioned elements include V, Mo, Ta, W and Nb having the bcc structure and Mn having a cubic structure.

The inventor of the present application conducted experiments relating to these addition elements. As a result of the experiments, the inventor has found that, when a Pt amount is varied within a range of 5–30 atomic % for Co—Cr—Pt-based magnetic materials, in order to obtain good epitaxial growth, it is necessary to adjust the Pt amount in such a manner that a difference in mean metal atom radius between a Co—$Cr_{25}$—$M_y$ underlayer material and the Co—Cr—Pt-based magnetic materials is 3% or less, and that, to this end, the addition amounts of the nonmagnetic material of the Co—$Cr_{25}$—My underlayer are included more preferably in ranges which follow.

That is, Mn: 3 atomic %≦y≦25 atomic %, Rh: 3 atomic %≦y≦25 atomic %, Os: 3 atomic %≦y≦25 atomic %, Ir: 3 atomic %≦y≦25 atomic %, V: 3 atomic %≦y≦25 atomic %, Re: 3 atomic %≦y≦25 atomic %, Pd: 3 atomic %≦y≦25 atomic %, Pt: 3 atomic %≦y≦25 atomic %, Mo: 3 atomic %≦y≦22 atomic %, Ta: 3 atomic %≦y≦21 atomic %, W: 3 atomic %≦y≦15 atomic %, Au: 3 atomic %≦y≦16 atomic %, Ti: 3 atomic %≦y≦15 atomic %, Nb: 3 atomic %≦y≦12 atomic %, Zr: 2 atomic %≦y≦20 atomic %, Hf: 3 atomic %≦y≦16 atomic %, Ag: 3 atomic %≦y≦16 atomic %, and Al: 3 atomic %≦y≦14 atomic %. Even when the Cr addition amount of the Co—$Cr_{25}$—$M_y$ underlayer material is varied up to 35 atomic % in these ranges, this resulted in substantially no change in the mean metal atom radius.

Other one of the means for attaining the above object in the present invention is to employ at least one of elements B, C, Si, Ge and P smaller in metal atom radius than elements Co and Cr as the nonmagnetic element M forming the Co—$Cr_x$—$M_y$ alloy film. In this case, a difference in mean atom radius between the Co alloy magnetic film 14 and Co—$Cr_x$—$M_y$ upper underlayer 12b formed directly under the Co alloy magnetic film 14 is increased so that crystalline distortion takes place in an interface between the film and underlayer.

In this case, however, since B, C, Si, Ge or P smaller in atom radius than Co forming the underlayer or Cr moving more easily than Co between crystal lattices can be diffusingly moved into the grain boundary of the Co alloy magnetic film, the distortion of the both films can be effectively lightened. As a result, a high magnetic anisotropy energy state can be realized.

In this case, when the Cr amount is 25 atomic %, the suitable M addition amounts of the Co—$Cr_x$—$M_y$ alloy film are 2 atomic %≦y≦14 atomic % for B, 1 atomic %≦y≦12 atomic % for C, 0.5 atomic %≦y≦15 atomic % for Si, 0.5 atomic %≦y≦16 atomic % for Ge, and 0.5 atomic %≦y≦10 atomic % for P. Even the Cr addition amount was varied within a range of 15–30 atomic %, this caused substantially no change of the suitable M addition amounts.

A weak magnetic range allowable as the underlayer is such a range that saturation magnetization Ms is 30 emu/cc or less. When the Co—$Cr_{25}$—$M_y$ underlayer is formed at a high substrate temperature, segregation of Cr to the grain boundary may take place to cause magnetization, but the Co—$Cr_{25}$—$M_y$ underlayer having the addition element M added by the above amount has a feature of being able to keep the saturation magnetization Ms at 30 emu/cc or less.

When the Co—$Cr_{25}$—$M_y$ alloy film is provided as the upper underlayer 12b contacted with the recording magnetic film 14 of the Co alloy as mentioned above, the crystallographic quality of grains forming the recording magnetic film 14 can be improved and its coercive force can be increased. When M (Al, Ti, V, Nb, Zr, Hf, Mn, Rh, Os, Ir, Re, Pd, Pt, Mo, Ta, W, Au, Ag) addition amounts in the Co—$Cr_{25}$—$M_y$ film are adjusted so that a difference in mean metal atom radius between the upper underlayer 12b and magnetic film 14 is 3% or less, these effects can be amplified.

When the Cro—$Cr_{25}$—$M_y$ film is provided as the underlayer, a Co alloy containing Pt and preferably a Co alloy containing 5–30 atomic % of Pt addition is especially effective as the recording magnetic film material. The Co alloy magnetic film containing such a range of Pt addition amount has a high magnetic anisotropy energy and a good thermal stability characteristic and thus has a high coercive force, and thus can be used suitably as a high-density magnetic recording medium. In the Co—$Cr_x$—$M_y$ alloy film, on the other hand, in the case of M (B, C, Si, Ge, P) having atom radii smaller than Co, it is desirable that a difference in mean atom radius between M and Co be 4% or less.

In this connection, the thickness of the Co—$Cr_{25}$—$M_y$ film is not smaller than 0.5 nm and not larger than 100 nm, and more desirably is not smaller than 1 nm and not larger than 30 nm. When the film thickness is not larger than 0.5 nm, the effect of the Co—$Cr_{25}$—$M_y$ alloy film is insufficient. Further, when the film thickness is not smaller than 100 nm, the thick film involves its more undulated surface. For this reason, it becomes difficult to secure a smooth medium surface necessary as a high-density magnetic recording medium.

<Embodiment 2>

Figure 2:
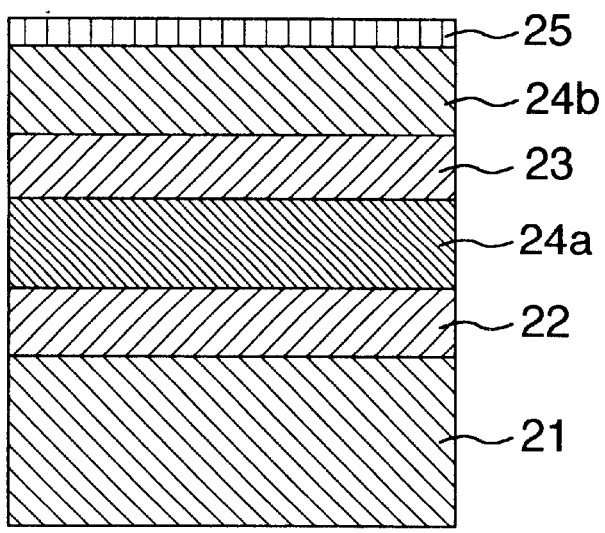
FIG. 2 is a cross-sectional view of a magnetic recording medium in accordance with another embodiment of the present invention.

FIG. 2 shows a second embodiment. Other effective one of the means for suppressing a crystal distortion or stress in a magnetic film to realize a high magnetic anisotropy energy and coercive force in accordance with the present invention is to introduce at least one Co—$Cr_x$—$M_y$ alloy film having a composition different from that of a magnetic film in the course of forming the magnetic film. An example of a sectional structure of a medium for realizing the above means is shown in FIG. 2.

An underlayer 22 is made of bcc structure material such as Cr, V or an alloy thereof. A magnetic film 24a of Co alloy is formed, and then a very thin Co—$Cr_x$—$M_y$ alloy film 23 is formed on the underlayer 22. The Co—$Cr_x$—$M_y$ alloy film 23 has preferably such a composition as mentioned above. Further, a magnetic film 24b of the Co alloy is formed on the Co—$Cr_x$—$M_y$ alloy film 23 and a protective film 25 is formed on the magnetic film 24b. In this conjunction, the magnetic films 24a and 24b provided on upper and lower sides of the Co—$Cr_x$—$M_y$ alloy film 23 may have an identical composition or different compositions, but desirably have an hcp structure containing at least 5 atomic % of and at most 30 atomic % of Pt.

The Co—$Cr_x$—$M_y$ alloy film 23 has a thickness of suitably not smaller than 0.2 nm and not larger than 5 nm. When the film thickness is not larger than 0.2 nm, the effect of introducing the Co—$Cr_x$—$M_y$ alloy film becomes weak;

whereas, when the film thickness is not smaller than 5 nm, undesirable influence such as a reduced coercive force of the magnetic film takes place.

<Embodiment 3>

Figure 3:
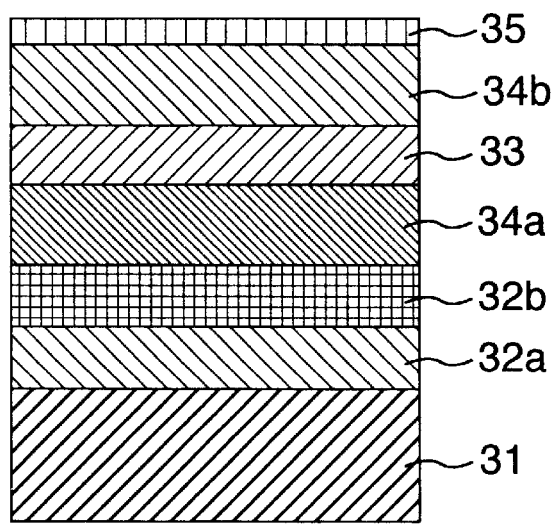
FIG. 3 is a cross-sectional view of a magnetic recording medium in accordance with a further embodiment of the present invention.

FIG. 3 shows a third embodiment. When the above means for simultaneously providing two underlayers is employed, there can be obtained more desirable characteristics for a high-density magnetic recording medium. An example thereof is shown in FIG. 3. A bcc structure material layer is provided as a lower underlayer 32a, and an upper underlayer 32b is provided on the lower underlayer 32a as the Co—$Cr_x$—$M_y$ alloy film having an hcp structure. Further sequentially formed on the upper underlayer 32b are a Co alloy magnetic film 34a, a very thin layer 33 as a Co—$Cr_x$—$M_y$ alloy film, a Co alloy magnetic film 34b and a protective film 35. A plurality of films of e.g., an adhesion reinforcing layer, a crystalline grain size control layer, and a soft-magnetic film may be provided according to its application between the lower underlayer 32a and a substrate 31.

Figure 4:
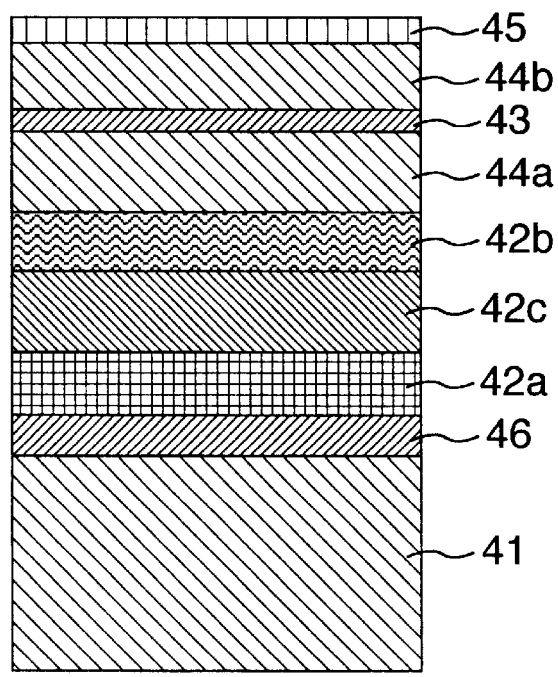
FIG. 4 is a cross-sectional view of a magnetic recording medium in accordance with yet a further embodiment of the present invention.

Shown in FIG. 4 is a section of a structure of a magnetic recording medium arranged so as to control a grain size distribution of crystals forming a recording magnetic film. An adhesion reinforcing layer 46 of Cr or Cr alloy is provided on a nonmagnetic substrate 41, and thereafter a lower underlayer 42a having an NaCl type crystalline structure such as MgO or LiF is formed on the adhesion reinforcing layer 46. A film of MgO, LiF or the like can be easily formed into a (100) orientation film and can easily have an ordered grain size distribution. By adjusting film formation conditions (substrate temperature, film formation rate, etc.), there can be easily formed an underlayer having a grain size of about 10 nm desirable for realization of a recording density of 10 $Gb/in^2$. An intermediate underlayer 42c is made up of either a material having the bcc structure or a material having the B2 type crystal structure, or both the materials coated, while an upper underlayer 42b is made up of a Co—$Cr_x$—$M_y$ alloy film having a hcp structure. Sequentially formed thereon are a recording magnetic film 44a of a Co alloy having the hcp structure, a very thin Co—$Cr_x$—$M_y$ film 43, a recording magnetic film 44b having a Co alloy having the hcp structure, and a protective film 45.

For the purpose of realizing high-density magnetic recording, it is necessary to make the grain size finer in proportion to an improvement in the recording density and also to make the grain size distribution narrower. The aforementioned magnetic recording medium can satisfy such conditions.

Explanation will be explained in detail as to the magnetic recording media in accordance with the embodiments of the present invention.

The first embodiment can be implemented in the following manner. More specifically, a glass substrate having a diameter of 2.5 inches was prepared and processed by a D.C. magnetron sputtering method to prepare a longitudinal magnetic recording medium having such a sectional structure as shown in FIG. 1. Sequentially formed on the substrate 11 were a lower underlayer 12a, an upper underlayer 12b, a recording magnetic film 14 and protective film 15 in this order.

As targets for formation of the respective films, an NiAl target was used for the lower underlayer 12a, a Co—$Co_x$—$M_y$ target was used for the upper underlayer 12b, a Co—Cr (21 atomic %)-Pt(15 atomic %) target was used for the recording magnetic film 14, and a carbon target was used for the protective film 15.

Under conditions of 3 mTorr of sputtering Ar gas pressure, 10 $W/cm^2$ of sputtering power and 250° C. of substrate temperature; the lower underlayer 12a of NiAl was formed to have a thickness of 15 nm, the upper underlayer 12b was to have a thickness of 5 nm, the magnetic film 14 was to have a thickness of 16 nm, and the protective film 15 of carbon was to have a thickness of 8 nm, respectively. Coated on the protective film 15 as a lubricant film was a perfluoropolyether-based material to form a film (not shown).

Under conditions of 3 mTorr of sputtering Ar gas pressure, 10 $W/cm^2$ of sputtering power and 250° C. of substrate temperature; the lower underlayer 12a of NiAl was formed to have a thickness of 15 nm, the upper underlayer 12b was to have a thickness of 5 nm, the magnetic film 14 was to have a thickness of 16 nm, and the protective film 15 of carbon was to have a thickness of 8 nm, respectively. Coated on the protective film 15 as a lubricant film was perphloropolyether-based material to form a film (not shown).

Prepared as comparative samples were a sample (comparative example 1) having a magnetic film 14 of Co-21 at %Cr-15 at %Pt directly formed on an NiAl lower underlayer 12a without provision of the upper underlayer 12b, as well as a sample (comparative example 2) having an upper underlayer 12b of Co-35 at %Cr nonmagnetic material without the element M added therein and also having an NiAl lower underlayer 12a provided thereon with the upper underlayer.

These samples were measured by a variable sample magnetometer (VSM) with respect to their coercive forces, and evaluation of their read/write characteristics was conducted with use of a read/write separation type magnetic head. The recording head was set to have a gap length of 0.2 $\mu$m, a reproducing spin valve head (high-sensitivity magneto-resistive read-back head) was set to have a shield interval of 0.2 $\mu$m, and a spacing (between the recording medium and head) at the time of measurement was set at 0.04 $\mu$m. A measurement of a recording signal varying with time was evaluated as a ratio of a reproduction output ($S_{t=0}$) immediately after recording of 350 kFCI (FCI:flux change per inch) of magnetic recording signal to a reproduction output ($S_{t=100}$) after passage of 100 hours.

Table 1 shows measurement results of the coercive force and survival ratio ($S_{t=100}/S_{t=0}$) of the recording signal with respect to the prepared samples.

TABLE 1

| No. | Upper underlayer: Co—$Cr_x$—$M_y$ | Coercive force (kOe) | Signal Survival ratio ($S_{t=100}/S_{t=0}$) |
|---|---|---|---|
| 1 | Co-25 at % Cr-6 at % B | 2.9 | 0.91 |
| 2 | Co-25 at % Cr-8 at % Si | 2.7 | 0.90 |
| 3 | Co-25 at % Cr-10 at % Ge | 3.0 | 0.93 |
| 4 | Co-25 at % Cr-4 at % Al | 2.7 | 0.90 |
| 5 | Co-25 at % Cr-6 at % P | 2.9 | 0.95 |
| 6 | Co-25 at % Cr-6 at % Ti | 3.2 | 0.96 |
| 7 | Co-25 at % Cr-10 at % V | 3.4 | 0.96 |
| 8 | Co-25 at % Cr-4 at % Zr | 2.8 | 0.91 |
| 9 | Co-25 at % Cr-8 at % Nb | 3.3 | 0.94 |
| 10 | Co-25 at % Cr-6 at % Hf | 3.1 | 0.93 |
| 11 | Co-25 at % Cr-10 at % Mn | 3.6 | 0.96 |
| 12 | Co-25 at % Cr-12 at % Rh | 3.1 | 0.94 |
| 13 | Co-25 at % Cr-18 at % Ir | 3.0 | 0.93 |
| 14 | Co-25 at % Cr-14 at % Re | 3.2 | 0.95 |
| 15 | Co-25 at % Cr-8 at % Pd | 2.9 | 0.92 |
| 16 | Co-25 at % Cr-6 at % Pt | 2.9 | 0.91 |
| 17 | Co-25 at % Cr-4 at % Mo | 3.2 | 0.94 |
| 18 | Co-25 at % Cr-8 at % W | 3.1 | 0.93 |
| 19 | Co-25 at % Cr-4 at % Ag | 3.0 | 0.92 |
| 20 | Co-25 at % Cr-6 at % Au | 3.0 | 0.92 |
| | Comparative example 1 | 2.1 | 0.82 |
| | Comparative example 2 | 2.4 | 0.85 |

The magnetic recording media of the present invention have coercive forces as high as 2.7 kOe or more and recording signal survival ratios of 0.9 or more, respectively.

On the other hand, the samples of the comparative examples 1 and 2 have coercive forces of 2.5 kOe or less and low recording signal survival ratios of 0.85 or less, respectively. In this way, it has been confirmed that the magnetic recording media of the present invention are effective as high-density magnetic recording media with less deterioration of the recording signal.

The second embodiment can be implemented in the following manner. More specifically, a glass substrate having a diameter of 2.5 inches was prepared and processed by the D.C. magnetron sputtering method to prepare a longitudinal magnetic recording medium having such a sectional structure as shown in FIG. 2.

Sequentially formed on a substrate 21 were an underlayer 22, a Co alloy-based magnetic film 24a provided closer to the substrate 21, a very thin Co—$Cr_x$—$M_y$ alloy film 23 of nonmagnetic or weak magnetic material having an hcp structure, a recording magnetic film 24b of Co alloy-based material provided closer to its surface and a protective film 25 in this order.

The underlayer 22 was formed with use of two types of targets of Cr and Cr-15 at %Ti and was formed on its side adjacent to the substrate 21 with a 5 nm-thick Cr-15 at %Ti film, thus forming two layers of the underlayer 22. Further, the recording magnetic film 24a of Co alloy based material was formed with use of a Co-21 at %Cr-8 at %Pt target.

Used as targets for formation of the Co—$Cr_x$—$M_y$ alloy film 23 were Co-30 at %Cr-5 at %B, Co-30 at %Cr-4 at %Si, Co-30 at %Cr-6 at %Ge, Co-30 at %Cr-4 at %Al, Co-30 at %Cr-6 at %P, Co-30 at %Cr-4 at %Ti, Co-30 at %Cr-10 at %V, Co-30 at %Cr-4 at %Zr, Co-30 at %Cr-6 at %Nb, Co-30 at %Cr-6 at %Hf, Co-30 at %Cr-10 at %Mn, Co-30 at %Cr-8 at %Rh, Co-30 at %Cr-8 at %Ir, Co-30 at %Cr-7 at %Re, Co-30 at %Cr-8 at %Pd, Co-30 at %Cr-6 at %Pt, Co-30 at %Cr-4 at %Mo, Co-30 at %Cr-4 at %W, Co-30 at %Cr-3 at %Ag and Co-30 at %Cr-4 at %Au targets.

The Co alloy-based recording magnetic film 24b was formed with use of a Co-21 at %Cr-10 at %Pt target.

Under conditions of 3 mTorr of sputtering Ar gas pressure, 10 W/cm$^2$ of sputtering power and 270° C. of substrate temperature; the underlayer 22 was formed to have a total thickness of 10 nm of the Cr-15 at %Ti layer (5 nm) and Cr layer (5 nm), the magnetic film 24a was formed to have a thickness of 8 nm, the Co—$Cr_x$—$M_y$ alloy film 23 was formed to have a thickness of 0.5 nm, the magnetic film 24b was formed to have a thickness of 8 nm, and the carbon film 25 was formed to have a thickness of 10 nm, respectively. Coated on the protective film 25 as a lubricant film was a perfluoropolyether-based material to form a film.

Prepared as comparative samples were magnetic recording media having similar structures except that the very thin Co—$Cr_x$—$M_y$ film 23 is not formed.

Similarly to the case of the embodiment 1, these samples were measured by the variable sample magnetometer with respect to their coercive forces, and evaluation of their read/write characteristics was conducted with use of a read/write separation type magnetic head. The recording head was set to have a gap length of 0.2 μm, a reproducing spin valve head was set to have a shield interval of 0.2 μm, and a spacing at the time of measurement was set at 0.04 μm. A measurement of a recording signal varying with time was evaluated as a ratio of a reproduction output ($S_{t=0}$) immediately after recording of 350 kFCI of magnetic recording signal to a reproduction output ($S_{t=100}$) after passage of 100 hours.

Table 2 shows measurement results of the coercive force and survival ratio ($S_{t=100}/S_{t=0}$) of the recording signal with respect to the prepared samples.

TABLE 2

| No. | Co—$Cr_x$—$M_y$ film | Coercive force (kOe) | Signal Survival ratio ($S_{t=100}/S_{t=0}$) |
|---|---|---|---|
| 1 | Co-30 at % Cr-5 at % B | 3.4 | 0.94 |
| 2 | Co-30 at % Cr-4 at % Si | 3.1 | 0.91 |
| 3 | Co-30 at % Cr-6 at % Ge | 3.0 | 0.91 |
| 4 | Co-30 at % Cr-4 at % Al | 2.9 | 0.92 |
| 5 | Co-30 at % Cr-6 at % P | 3.0 | 0.93 |
| 6 | Co-30 at % Cr-4 at % Ti | 3.4 | 0.94 |
| 7 | Co-30 at % Cr-10 at % V | 3.5 | 0.96 |
| 8 | Co-30 at % Cr-4 at % Zr | 2.9 | 0.91 |
| 9 | Co-30 at % Cr-6 at % Nb | 3.6 | 0.95 |
| 10 | Co-30 at % Cr-6 at % Hf | 3.2 | 0.93 |
| 11 | Co-30 at % Cr-10 at % Mn | 3.7 | 0.96 |
| 12 | Co-30 at % Cr-8 at % Rh | 3.2 | 0.93 |
| 13 | Co-30 at % Cr-8 at % Ir | 3.3 | 0.94 |
| 14 | Co-30 at % Cr-7 at % Re | 3.2 | 0.92 |
| 15 | Co-30 at % Cr-8 at % Pd | 3.0 | 0.90 |
| 16 | Co-30 at % Cr-6 at % Pt | 3.3 | 0.93 |
| 17 | Co-30 at % Cr-4 at % Mo | 3.4 | 0.95 |
| 18 | Co-30 at % Cr-4 at % W | 3.3 | 0.92 |
| 19 | Co-30 at % Cr-3 at % Ag | 3.1 | 0.92 |
| 20 | Co-30 at % Cr-4 at % Au | 3.1 | 0.92 |
|  | Comparative example | 2.4 | 0.84 |

The magnetic recording media of the present invention have coercive forces as high as 2.5 kOe or more and recording signal survival ratios of 0.9 or more, respectively. On the other hand, the samples of the comparative examples have coercive forces of 2.3 kOe or less and low recording signal survival ratios of 0.8 or less, respectively. In this way, it has been confirmed that the magnetic recording media of the present invention are effective as high-density magnetic recording media with less deterioration of the recording signal.

<Embodiment 3>

The third embodiment can be implemented in the following manner. More specifically, a glass substrate having a diameter of 2.5 inches was prepared and processed by the D.C. magnetron sputtering method to prepare a longitudinal magnetic recording medium having such a sectional structure as shown in FIG. 3. Sequentially formed on a substrate 31 were a lower underlayer 32a, a Co—$Cr_x$—$M_y$ upper underlayer 32b of nonmagnetic or weak magnetic material having a hcp structure, a recording magnetic film 34a provided closer to the substrate 31, a very thin Co—$Cr_x$—$M_y$ alloy film 33 of nonmagnetic or weak magnetic material having an hcp structure, a recording magnetic film 34b of Co alloy-based material provided closer to its surface, and a protective film 25 in this order.

Used as targets for formation of the respective films were a Cr target for the lower underlayer 32a, a Co—$Cr_x$—$M_y$ target for formation of the upper underlayer 32b and very thin 33, and a Co-20 at %Cr-8 at %Pt target for formation of the recording magnetic films 34a and 34b.

Used as the Co—$Cr_x$—$M_y$ targets were Co-20 at %Cr-14 at %B, Co-20 at %Cr-14 at %Si, Co-20 at %Cr-10 at %Ge, Co-20 at %Cr-10 at %Al, Co-20 at %Cr-10 at %P, Co-20 at %Cr-14 at %Ti, Co-20 at %Cr-13 at %V, Co-20 at %Cr-6 at %Zr, Co-20 at %Cr-10 at %Nb, Co-20 at %Cr-12 at %Hf, Co-20 at %Cr-16 at %Mn, Co-26 at %Cr-12 at %Rh, Co-26 at %Cr-12 at %Ir, Co-26 at %Cr-8 at %Re, Co-26 at %Cr-8 at %Pd, Co-26 at %Cr-6 at %Pt, Co-20 at %Cr-4 at %Mo, Co-20 at %Cr-8 at %W, Co-26 at %Cr-6 at %Ag and Co-26 at %Cr-4 at %Au targets.

Under conditions of 3 mTorr of sputtering Ar gas pressure, 10 W/cm$^2$ of sputtering power and 270° C. of substrate temperature; the Cr lower underlayer 32a was formed to have a thickness of 10 nm, the upper underlayer 32b as the Co—$Cr_x$—$M_y$ film was formed to have a thickness of 5 nm, the lower magnetic film 34a was formed to have a thickness of 8 nm, the very thin Co—$Cr_x$—$M_y$ alloy film 33 as the same type of Co—$Cr_x$—$M_y$ film was formed to have a thickness of 0.3 nm, the upper magnetic film 34b was formed to have a thickness of 8 nm, and the carbon film 35 was formed to have a thickness of 10 nm, respectively. Coated on the protective film 35 as a lubricant film was a perfluoropolyether-based material to form a film.

Prepared as comparative samples were magnetic recording media having similar structures except that the Co—$Cr_x$—$M_y$ films 32b and 33 are not formed.

Similarly to the case of the embodiment 1, these samples were measured by the variable sample magnetometer with respect to their coercive forces, and evaluation of their read/write characteristics was conducted with use of a read/write separation type magnetic head. The recording head was set to have a gap length of 0.2 μm, a reproducing spin valve head was set to have a shield interval of 0.2 μm, and a spacing at the time of measurement was set at 0.04 μm. A measurement of a recording signal varying with time was evaluated as a ratio of a reproduction output ($S_{t=0}$) immediately after recording of 350 kFCI of magnetic recording signal to a reproduction output ($S_{t=100}$) after passage of 100 hours.

Table 3 shows measurement results of the coercive force and survival ratio ($S_{t=100}/S_{t=0}$) of the recording signal with respect to the prepared samples.

TABLE 3

| No. | Film material Co—$Cr_x$—$M_y$ | Coercive force (kOe) | Signal Survival ratio ($S_{t-100}/S_{t-0}$) |
|---|---|---|---|
| 1 | Co-20 at % Cr-14 at % B | 3.5 | 0.95 |
| 2 | Co-20 at % Cr-14 at % Si | 3.2 | 0.92 |
| 3 | Co-20 at % Cr-10 at % Ge | 3.1 | 0.91 |
| 4 | Co-20 at % Cr-10 at % Al | 3.0 | 0.93 |
| 5 | Co-20 at % Cr-10 at % P | 3.1 | 0.92 |
| 6 | Co-20 at % Cr-14 at % Ti | 3.1 | 0.91 |
| 7 | Co-20 at % Cr-13 at % V | 3.4 | 0.94 |
| 8 | Co-20 at % Cr-6 at % Zr | 3.0 | 0.90 |
| 9 | Co-20 at % Cr-10 at % Nb | 3.4 | 0.93 |
| 10 | Co-20 at % Cr-12 at % Hf | 3.1 | 0.93 |
| 11 | Co-20 at % Cr-16 at % Mn | 3.5 | 0.94 |
| 12 | Co-26 at % Cr-12 at % Rh | 3.3 | 0.92 |
| 13 | Co-26 at % Cr-12 at % Ir | 3.3 | 0.93 |
| 14 | Co-26 at % Cr-8 at % Re | 3.0 | 0.92 |
| 15 | Co-26 at % Cr-8 at % Pd | 3.1 | 0.91 |
| 16 | Co-26 at % Cr-6 at % Pt | 3.3 | 0.93 |
| 17 | Co-20 at % Cr-4 at % Mo | 3.4 | 0.96 |
| 18 | Co-20 at % Cr-8 at % W | 3.2 | 0.91 |
| 19 | Co-26 at % Cr-6 at % Ag | 3.0 | 0.90 |
| 20 | Co-26 at % Cr-4 at % Au | 2.9 | 0.90 |
| | Comparative example | 2.2 | 0.80 |

The magnetic recording media of the present invention have coercive forces as high as 2.5 kOe or more and recording signal survival ratios of 0.9 or more, respectively. On the other hand, the samples of the comparative examples have coercive forces of 2.3 kOe or less and low recording signal survival ratios of 0.8 or less, respectively. In this way, it has been confirmed that the magnetic recording media of the present invention are effective as high-density magnetic recording media with less deterioration of the recording signal.

<Embodiment 4>

FIG. 4 shows a fourth embodiment. More specifically, a glass substrate having a diameter of 2.5 inches was prepared and processed by the D.C. magnetron sputtering method and by a radio frequency (RF) magnetron sputtering method to prepare a longitudinal magnetic recording medium having such a sectional structure as shown in FIG. 4. Sequentially formed on a substrate 41 were an adhesion reinforcing layer 46, a lower underlayer 42a having an NaCl structure, an intermediate underlayer 42c, an upper nonmagnetic or weak magnetic underlayer 42b as a Co—$Cr_x$—$M_y$ film having an hap structure, a recording magnetic film 44a of Co alloy provided closer to the substrate 41, a a very thin Co—$Cr_x$—$M_y$ alloy film 43 of nonmagnetic or weak magnetic material having an hcp structure and provided closer to the substrate 41, a recording magnetic film 44b of Co alloy-based material provided closer to its surface, and a protective film 45 in this order.

Used as targets for formation of the respective films were a Cr target for the adhesion reinforcing layer 46, an MgO target for formation of the lower underlayer 42a having an NaCl structure, a Cr target for formation of the intermediate underlayer 42c, a Co-23 at %Cr-10 at %Mn target for formation of the upper underlayer 42b and very thin film Co—$Cr_x$—$M_y$ alloy film 43, a Co-21 at %Cr-5 at %Pt target for formation of the magnetic film 44a, a Co-20 at %Cr-8 at %Pt for formation of the magnetic film 44b, and a carbon target for formation of the protective film 45.

Under conditions of 3 mTorr of sputtering Ar gas pressure, 10 W/$cm^2$ of sputtering power and 270° C. of substrate temperature; the Cr adhesion reinforcing layer 46 was formed to have a thickness of 10 nm, the lower underlayer 42a as an MgO film was formed to have a thickness of 5 nm, the intermediate underlayer 42c as a Cr film was formed to have a thickness of 5 nm, the upper underlayer 42b as a Co-23 at %Cr-10 at %Mn was formed to have a thickness of 5 nm, the magnetic film 44a as a Co-21 at %Cr-5 at %Pt was formed to have a thickness of 7.5 nm, the very thin film 43 as a Co-23 at %Cr-10 at %Mn was formed to have a thickness of 1 nm, the magnetic film 44b as a Co-20 at %Cr-8 at %Pt was formed to have a thickness of 8 nm, and the carbon film 45 was formed to have a thickness of 10 nm, respectively. The MgO lower underlayer 42a was formed by the RF magnetron sputtering method.

Similarly to the case of the embodiment 1, these samples were measured by the variable sample magnetometer with respect to their coercive forces, and evaluation of their read/write characteristics was conducted with use of a read/write separation type magnetic head. The recording head was set to have a gap length of 0.2 μm, a reproducing spin valve head was set to have a shield interval of 0.2 μm, and a spacing at the time of measurement was set at 0.04 μm. A measurement of a recording signal varying with time was evaluated as a ratio of a reproduction output ($S_{t=0}$) immediately after recording of 350 kFCI of magnetic recording signal to a reproduction output ($S_{t=100}$) after passage of 100 hours.

The samples have coercive forces as high as 3.6 kOe and recording signal survival ratios of 0.95 or more, respectively. In this way, it has been confirmed that the magnetic recording media of the present invention are effective as high-density magnetic recording media with less deterioration of the recording signal.

<Embodiment 5>

In this embodiment, in the upper underlayer 32b as well as the nonmagnetic or weak magnetic Co—$Cr_x$—$M_y$ film having the hcp structure as the very thin film 33 in the embodiment 3, one type of Mn was used as the addition element M, Cr was varied in a range of 0–50 atomic % and Mn was varied in a range of 0–50 atomic % in composition to prepare a plurality of magnetic recording media. The preparation conditions are similar to those in the embodiment 3 and a sectional structure of each of the prepared recording media is the same as that in FIG. 3. Adjustment of the composition was carried out by using a Co target as a base target for formation of the Co—$Cr_x$—$Mn_y$ film and placing Cr and Mn pellet-like chips on the target.

Similarly to the case of the embodiment 3, the prepared samples were measured by the variable sample magnetometer with respect to their coercive forces, and evaluation of their read/write characteristics was conducted with use of a read/write separation type magnetic head. The recording head was set to have a gap length of 0.2 µm, a reproducing spin valve head was set to have a shield interval of 0.2 µm, and a spacing at the time of measurement was set at 0.04 µm. A measurement of a recording signal varying with time was evaluated as a ratio of a reproduction output ($S_{t=0}$) immediately after recording of 350 kFCI of magnetic recording signal to a reproduction output ($S_{t=100}$) after passage of 100 hours.

Figure 5:
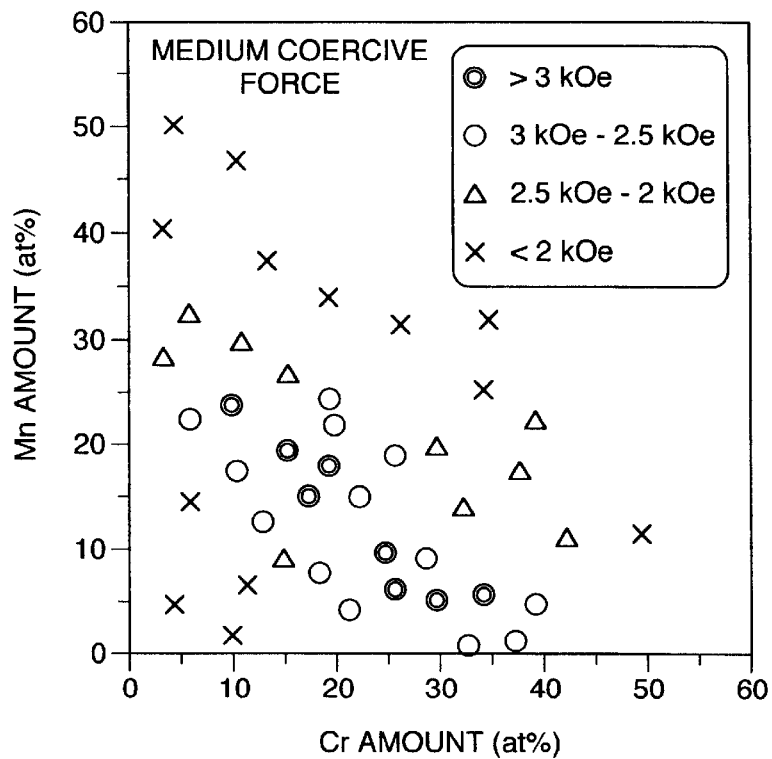
FIG. 5 is a graph for explaining a relationship between Co—$Cr_x$—$Mn_y$ composition and medium coercive force.
Figure 6:
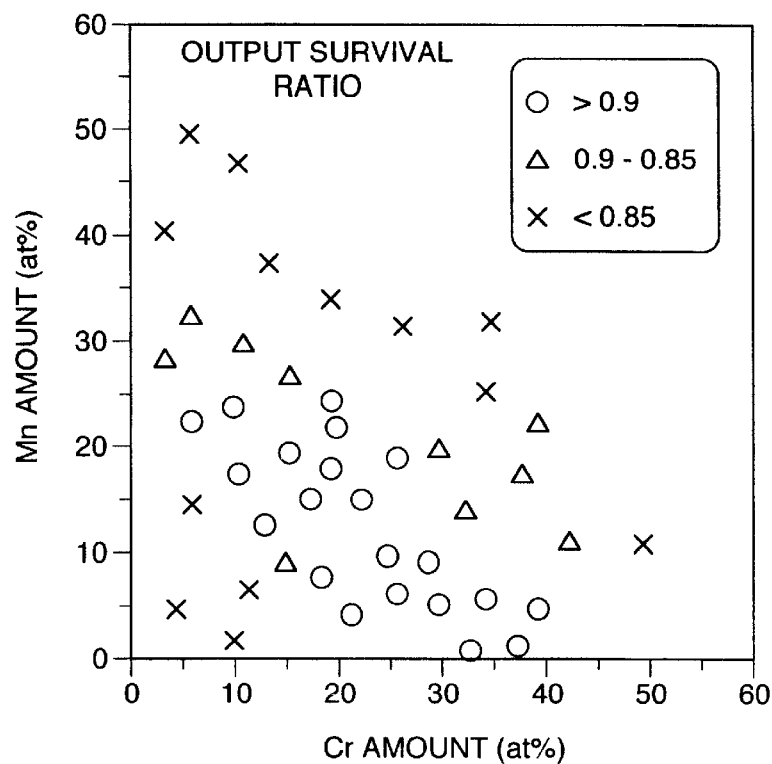
FIG. 6 is a graph for explaining a relationship between the Co—$Cr_x$—$Mn_y$ composition and a survival ratio of a recording signal.

Measured results of the survival ratio ($S_{t=100}/S_{t=0}$) of the cocercive force and reproduction output of the prepared test media are shown in FIGS. 5 and 6 respectively. When the composition range of Co—$Cr_x$—$Mn_y$ satisfies relationships of 25 atomic %≦x+y≦50 atomic % and 0.5 atomic %≦y, it has been confirmed that an especially high survival ration between the coercive force and reproduction output is attained and that the aforementioned composition range is effective especially for a high-density magnetic recording medium.

<Embodiment 6>

Explanation will be made as to a magnetic recording medium in accordance with a sixth embodiment of the present invention by also referring to FIG. 1. Formed on a substrate 11 is a lower underlayer 12a have a B2 type crystal structure to control the orientation and grain size of the crystal. An NiAl, FeAl, FeV, CuZn, CoAl or CuPd ordered phase material, which has a B2 type crystal structure, has a property that, when a film of the above material is formed on a substrate, a (100) plane in the film easily grows parallel to the substrate. Further, a distribution of crystalline grains in the film having such a B2 type crystal structure tends to be smaller that that of the film of single metal such as Cr, V or Nb. When the material having the B2 type crystal structure is formed on the nonmagnetic substrate by a sputtering method, a (112) oriented film grows preferentially. When a Co alloy film having an hcp structure is formed on the above B2 type crystal structure layer, epitaxial growth causes a (10$\overline{1}$0) to grow parallel to the substrate. At this time, a thin-film material having the bcc structure such as Cr or the like may be present between the material having the B2 type crystal structure and the Co-alloy film having the hcp structure, by which can be obtained the same effect as described above. In the present invention, an upper underlayer 12b of nonmagnetic or weak magnetic Co—$Ru_x$—$Cr_y$ alloy material is formed on the lower underlayer 12a. In this case, its composition range is set to satisfy relationships of 5 atomic %≦x≦65 atomic % and 35 atomic %≧y≧0 atomic %.

Elements Co and Ru are metal materials which have the hcp structure and are overall-yield solid-dissolved, so that, when 34 atomic % or more of Ru is solid dissolved in Co, the Co alloy material is changed to a nonmagnetic property. The element Ru has a metal atom radius of 1.32 angstroms larger than a metal atom radius of 1.26 angstroms of the element Co, so that when Ru is added in Co, the Co alloy material increases in its mean metal atom radius. A Co alloy magnetic film used in a recording layer of the magnetic recording medium is made of material containing Co added by element Cr, Ta, Pt, Nb, B or Y, so that the mean metal atom radius of the alloy magnetic film becomes usually larger than that of the pure Co. The material of the upper underlayer has an hcp structure similar to the Co alloy and, in order to adjust epitaxial growth conditions, the upper underlayer material is required to have a small mean metal atom radius difference and also to be nonmagnetic or weak magnetic. According to inventor's experiments, it has been found that the mean atom radii of the Co—Cr—Ta, Co—Cr—Pt, Co—Cr—Pt—Ta, Co—Cr—Pt—Ta—Nb, and Co—Cr—Pt—Ta—B are in a range of 1.265–1.290 angstroms. In particular, a medium having Pt added in Co as an alloy element, the mean metal atom radius of the medium increases substantially in proportion to the amount of added Pt, since Pt has a large atom radius of 1.38 angstroms. In order to obtain an average atom radius in the above range in the two-element material of Co—Ru, it was necessary to add 5–65 atomic % of Ru in Co.

In a range of a Ru addition amount as small as 5–34 atomic %, the alloy exhibits a magnetic property. In order to make the alloy nonmagnetic or weak magnetic, Cr is added. Element Cr has a metal atom radius of 1.28 angstroms close to that of Co, so that, even addition of Cr in Co causes substantially no change of its mean metal atom radius. Addition of 25 atomic % or more of Cr in Co causes the Co—Cr alloy to become nonmagnetic. In a range of 5–34 atomic % of Ru addition amount in Co, it is necessary to make the Co—Ru—Cr material nonmagnetic or weak magnetic, by adding a maximum of 35 atomic % of Cr. In a weak magnetic range allowable for an underlayer, a saturation magnetization (Ms) is 30 emu/cc or less. In the case of a Co—Ru5-Cry alloy, it corresponds to y>19 atomic %. It is effective to adjust the amount of added Cr according to the amount of Ru added in Co. In a range of Ru addition amount exceeding 30 atomic %, Ms<30 emu/cc even when 0 atomic % of Cr is added. Thus a Cr addition amount range in the Co—$Ru_x$—$Cr_y$ alloy becomes 34 atomic %≧y≧0 atomic %. In this connection, for the purpose of making uniform the grain sizes of crystal in the Co—$Ru_x$—$Cr_y$ alloy underlayer and also clarifying a grain boundary to improve a function as an underlayer, it is desirable that a Cr addition amount satisfy a relationship of y≧5 atomic %. Cr addition causes Cr to be selectively segregated in the grain boundary in the alloy, thus producing the above desirable effect.

When the aforementioned Co—$Ru_x$—$Cr_y$ alloy is provided as the upper underlayer 12b as a recording magnetic film of Co alloy, the crystallization of grains in the recording magnetic film can be improved with an increased coercive force. When a Ru addition amount is adjusted in the Co—$Ru_x$—$Cr_y$ alloy so that a difference in mean metal atom radius between the magnetic film and upper underlayer 12b becomes 5% or less, these effects can be amplified. When the upper underlayer 12b is made of the Co—$Ru_x$—$Cr_y$ alloy, an especially effective recording magnetic film is made of a Co alloy containing Pt, and a Pt addition amount range is suitably 5–30 atomic %. The Co alloy magnetic film containing an amount of Pt in this composition range can be suitably applied to a magnetic recording medium having a high magnetic anisotropy energy, good thermal stability characteristics and a high coercive force.

The thickness of the Co—$Ru_x$—$Cr_y$ alloy is not smaller than 0.5 nm and not larger than 100 nm and more desirably not smaller than 1 nm and not larger than 50 nm. In the case of the thickness of the alloy film of 0.5 nm or less, crystal distortion remains in the Co—$Ru_x$—$Cr_y$ alloy film under the influence of the lower underlayer 12a. Further, in the case of the thickness of the alloy film of 100 nm or more, the surface undulation becomes correspondingly great. As a result, it becomes difficult to secure a smooth medium surface necessary as a high-density magnetic recording medium. Moreover, as described in the fourth embodiment above, the Co alloy recording film may be divided into two parts, and the Co—Ru$_x$—Cr$_y$ alloy film is present between the two parts, enhancing the coercive force of the medium and reducing deterioration of the recording film.

<Embodiment 7>

Explanation will be made as to a seventh embodiment with reference to FIG. 7. A lower underlayer 22 to be formed on a nonmagnetic substrate 21 is made of material having a bcc structure such as Cr, V or alloy thereof, an upper underlayer 23 is made of Co—Ru$_x$—Cr$_y$ (5 atomic % $\leq$ x $\leq$ 65 atomic %, 34 atomic % $\geq$ y $\geq$ 0 atomic %) alloy having an hcp structure, thus exhibiting effects similar to the above. In another embodiment of the present invention, the lower underlayer 22 is made of material having a bcc structure, a layer of material having a B2 type of crystal structure and a Co—Ru$_x$—Cr$_y$ (5 atomic % $\leq$ x $\leq$ 65 atomic %, 35 atomic % $\geq$ y $\geq$ 0 atomic %) alloy layer having an hcp structure are sequentially provided on the underlayer 22, and a recording magnetic film 24 of Co alloy is provided on the alloy layer. Alternately a layer of material having a B2 type crystal structure may be provided as the lower underlayer 22, a layer of material having a bcc structure such as Cr, V or alloy thereof may be provided on the B2 type crystal structure layer as an inter-mediate underlayer, a layer of Co—Rux—Cry (5 atomic % $\leq$ x $\leq$ 65 atomic %, 35 atomic % $\geq$ y $\geq$ 0 atomic %) alloy having an hcp structure may be provided on the bcc-structure layer as the upper underlayer 23, and a recording magnetic film 24 of Co alloy may be provided on the alloy layer.

$\leq$Embodiment 8>

Figure 8:
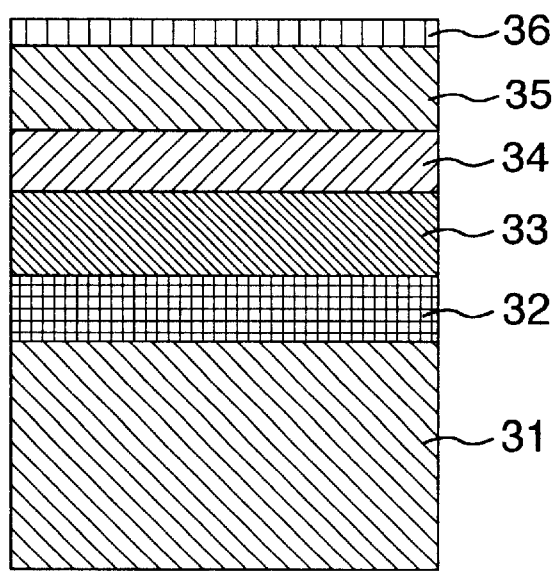
FIG. 8 shows, in a model form, a cross-sectional sectional view of a magnetic recording medium in accordance with another embodiment of the present invention.

FIG. 8 shows a cross-sectional view of a structure of a magnetic recording medium in accordance with an eighth embodiment of the present invention, which has a controlled distribution of crystal grains in a recording magnetic film. Formed on a nonmagnetic substrate 31 is a lower underlayer 32 having an NaCl type crystalline structure such as MgO or LiF. In the case of an MgO or LiF film, a (100) orientation film can be easily obtained, a grain size distribution can be easily made narrow, and its grain sizes can be easily made uniform. By adjusting film formation conditions (substrate temperature, film formation rate, etc.), there can be easily formed an underlayer having a grain size of about 10 nm desirable for realizing a recording density of 10 Gb/in$^2$ or more. An intermediate underlayer 33 is made of material having a B2 type crystal structure, and an upper underlayer 34 is made of Co—Ru$_x$—Cr$_y$ (5 atomic % $\leq$ x $\leq$ 65 atomic %, 35 atomic % $\geq$ y $\geq$ 0 atomic %) alloy material having an hcp structure. Formed on the upper underlayer 34 is a recording magnetic film 35 of Co alloy having an hcp structure.

$\leq$Embodiment 9>

Figure 9:
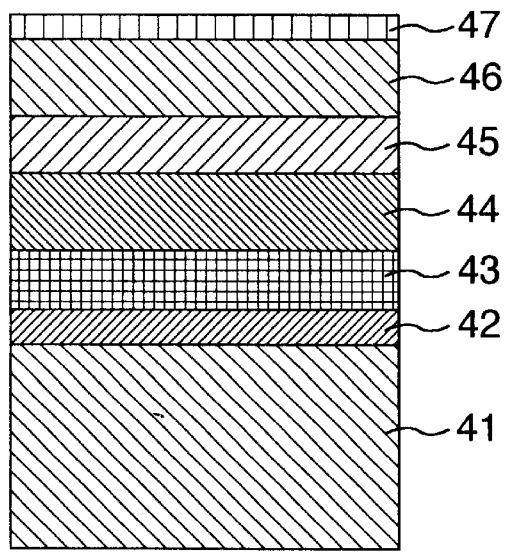
FIG. 9 shows, in a model form, a cross-sectional view of a magnetic recording medium in accordance with another embodiment of the present invention.
Figure 10:
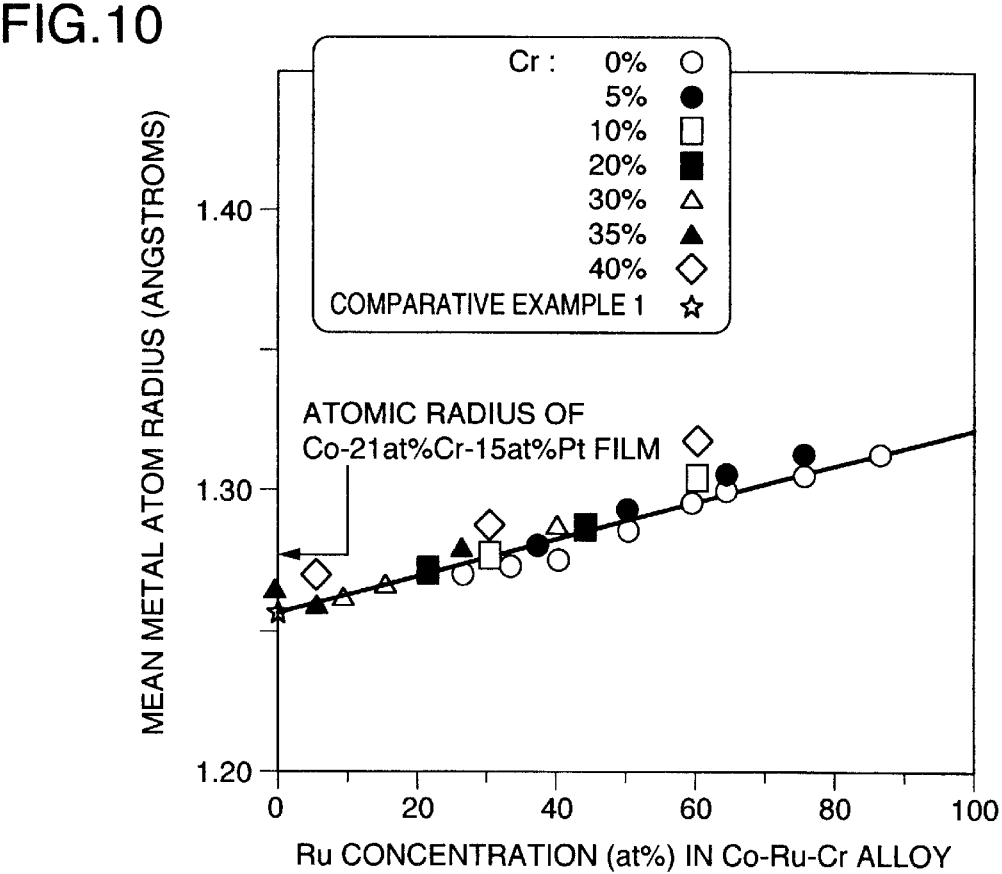
FIG. 10 is a graph showing a relationship between composition of an upper underlayer and mean metal atom radius.

FIG. 9 shows a ninth embodiment wherein, in order to increase an adhesion force between a nonmagnetic substrate 41 and a lower underlayer Co—Cr$_x$—M$_y$ alloy film 43 of material having an NaCl type crystalline structure such as MgO or LiF or to satisfy a condition that a layer of material having an NaCl structure can be easily formed to have a (100) orientation plane, an adhesion reinforcing layer 42 of Si, Cr, Ti, Nb, Zr, Hf, Ta, SiOx, ZrO$_2$, SiN or alloy thereof as main components is provided. The adhesion reinforcing layer 42 may be made, in addition to the above material, of alloy, for example, Si-30 at %Cr, Si-15 at %Ge, Nb-30 at %Zr, SiO$_2$+ZrO$_2$, or Sio$_2$+MgO or mixture thereof.

The sixth embodiment can be implemented in the following manner.

A glass substrate having a diameter of 2.5 inches was prepared and processed by the D.C. magnetron sputtering method to prepare a longitudinal magnetic recording medium having such a sectional structure as shown in FIG. 1 commonly used to the first embodiment. Sequentially formed on a substrate 11 were a lower underlayer 12a, an upper underlayer 12b, a recording magnetic film 14 and a protective film 15 in this order. An NiAl target was used for formation of the lower underlayer, a Co—Ru$_x$—Cr$_y$ target was used for formation of the upper underlayer, a Co-21 at %Cr-15 at %Pt target was used for formation of the recording magnetic film 14, and a carbon target was used for formation of the protective film 15. The composition of the Co—Ru$_x$—Cr$_y$ target was adjusted to satisfy film formation composition relationships of 3 atomic % $\leq$ x $\leq$ 70 atomic % and 40 atomic % $\geq$ y $\geq$ 0 atomic % with use of a mixture target, that is, by placing a Ru or Cr pellet on a Co-50 at %Ru alloy target.

Under conditions of 3 mTorr of sputtering Ar gas pressure, 10 W/cm$^2$ of sputtering power and 250° C. of substrate temperature; the NiAl film was formed to have a thickness of 15 nm, the upper underlayer 12b was formed to have a thickness of 5 nm, the recording magnetic film 14 was formed to having a thickness of 16 nm, and the carbon film was formed to have a thickness of 8 nm, respectively. Coated on the protective film 25 as a lubricant film was a perfluoropolyether-based material to form a film. The upper underlayer 12b of the prepared samples had compositions which follow. That is, Co-10 at %Ru, Co-20 at %Ru, Co-30 at %Ru, Co-35 at %Ru, Co40 at %Ru, Co-50 at %Ru, Co-60 at %Ru, Co-65 at %Ru, Co-75 at %Ru, Co-85 at %Ru, Co-10 at %Ru-5 at %Cr, Co-20 at %Ru-5 at %Cr, Co-30 at %Ru-5 at %Cr, Co-50 at %Ru-5 at %Cr, Co-65 at %Ru-5 at %Cr, CQ-75 at %Ru-5 at %Cr, Co-30 at %Ru-10 at %Cr, Co-60 at %Ru-10 at %Cr, Co-10 at %Ru-20 at %Cr, Co-20 at %Ru-20 at %Cr, Co-40 at %Ru-20 at %Cr, Co-10 at %Ru-30 at %Cr, Co-25 at %Ru-30 at %Cr, Co-40 at %Ru-30 at %Cr, Co-5 at %Ru-35 at %Cr, Co-25 at %Ru-35 at %Cr, Co-5 at %Ru-40 at %Cr and Co-30 at %Ru-30 at %Cr.

Prepared as comparative samples were s sample (comparative example 1) having a Co-21 at %Cr-15 at %Pt formed directly on the NiAl lower underlayer 12a as well as a sample (comparative example 2) having the nonmagnetic upper underlayer 12b of Co-35 at %Cr formed on the NiAl lower underlayer 12a to form a magnetic film 14 of Co-21 at %Cr-15 at %Pt.

In these samples, the upper underlayer 12b and recording magnetic film 14 are measured by an X-ray diffraction analysis method with respect to their mean metal atom radius, and are measured by the variable sample magnetometer (VSM) with respect to their coercive force. Further evaluation of the samples with respect to their read/write characteristics was carried out with use of a read/write separation type magnetic head. The recording head was set to have a gap length of 0.2 μm, a reproducing spin valve head was set to have a shield interval of 0.2μm, and a spacing at the time of measurement was set at 0.04μm. A measurement of a recording signal varying with time was evaluated as a ratio of a reproduction output (S$_{t=0}$) immediately after recording of 350 kFCI of magnetic recording signal to a reproduction output (S$_{t=100}$) after passage of 100 hours.

Table 10 shows measurement results of the mean metal atom radii of the Co—Ru—Cr alloy-based materials of the upper underlayer 12b and mean metal atom radii of the magnetic film 14 of Co-21 at %Cr-15 at %Pt. The metal atom radii of the Co—Ru—Cr alloy-based materials increased with the increased Ru concentration. The Ru concentration substantially equal to the metal atom radius of the magnetic film 14 was in an Ru range of 20–40 atomic %.

Figure 11:
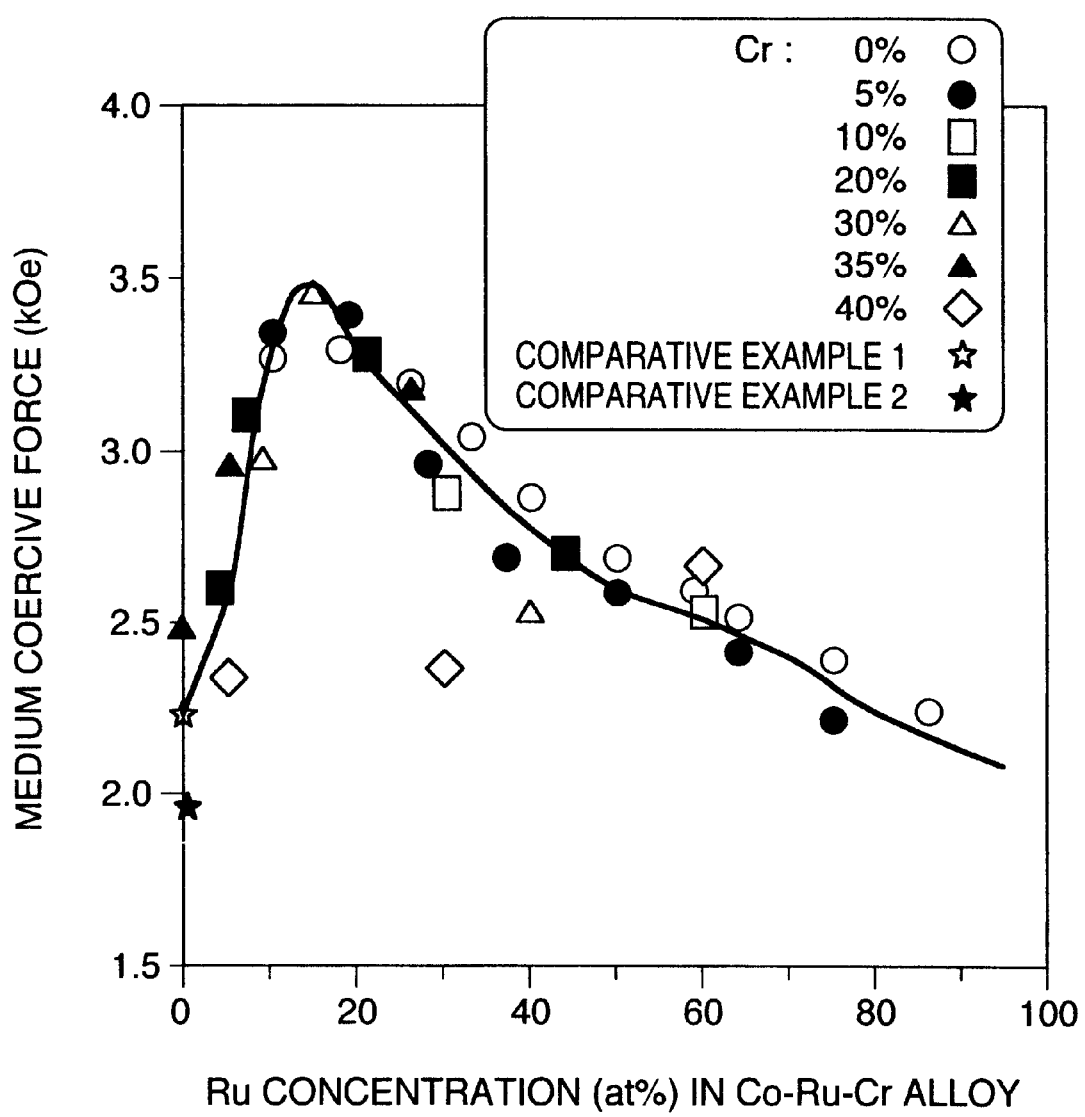
FIG. 11 is a graph showing a relationship between the composition of the upper underlayer and medium coercive force.

FIG. 11 shows a relationship between Ru concentration and medium coercive force of the Co—Ru—Cr alloy-based materials. In order to realize a recording density of 10 Gb/in$^2$ or more, it is considered necessary for a coercive force to be 2.5 kOe or more and for a Ru composition range to be 5–65 atomic %. In addition, even in the range, it has been found that, when a Cr concentration exceeds 35 atomic %, the coercive force is 2.5 kOe or less. In this connection, the Ru composition range is 10–30 atomic %, there can be obtained a coercive force of 3.0 kOe or more. In the samples of the comparative examples 1 and 2, on the other hand, their coercive forces were both 2.5 kOe or less. In this way, it has been confirmed that the present invention is effective in order to obtain a high coercive force.

Figure 12:
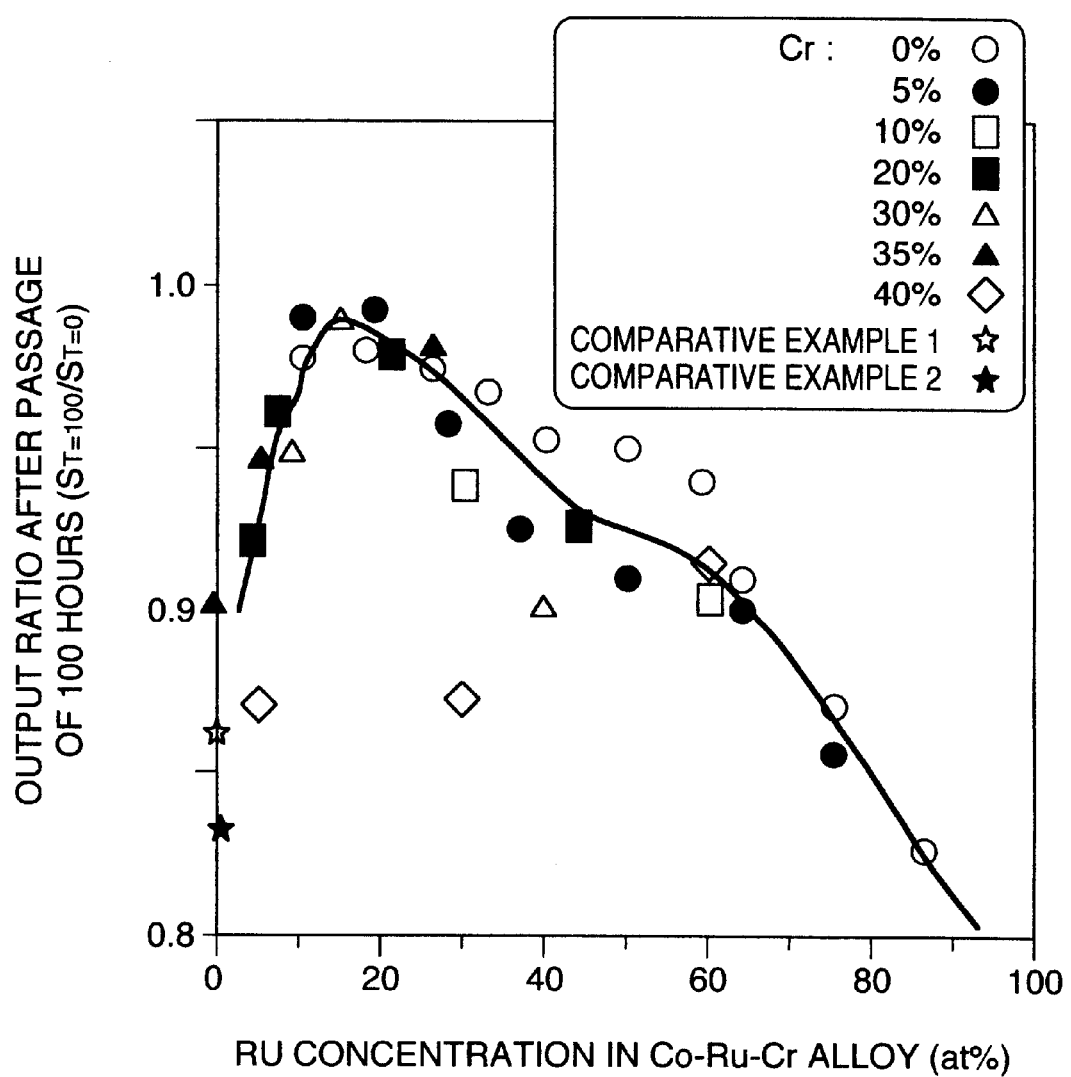
FIG. 12 is a graph showing a relationship between the composition of the upper underlayer and the output ratio of a magnetic recording signal.

FIG. 12 shows an output ratio of 350 kFCI recording signal after passage of 100 hours. It has been confirmed that, in the case of the Co—Ru$_x$—Cr$_y$ alloy, when its composition range satisfies relationships of 5 at %$\leq$x$\leq$65 at % and 35 at %$\geq$y$\geq$0, a ratio of 0.9 or more can be obtained. It will also be understood that when 10 atomic %$\leq$x$\leq$30 atomic %, a ratio of 0.95 or more can be obtained. It has also been found from comparison between the results of FIGS. 11 and 12 that media using the same recording magnetic film and exhibiting a high coercive force can have a stable recording signal. It has been found that the magnetic recording medium is improved in the decrease ratio of the recording signal over both samples of the comparative examples 1 and 2.

The seventh embodiment can be implemented in the following manner.

Figure 7:
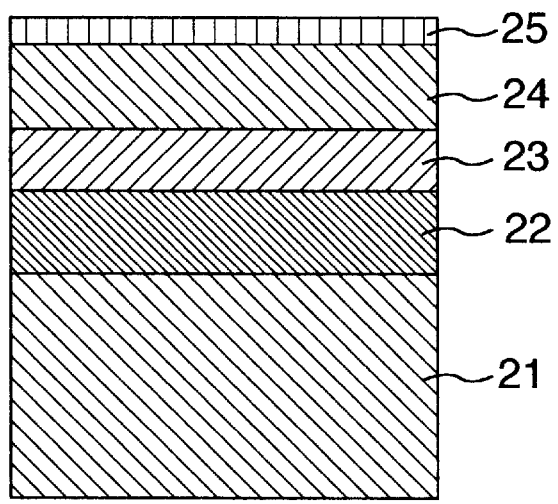
FIG. 7 shows, in a model form, a cross-sectional view of a magnetic recording medium in accordance with yet another embodiment of the present invention.

Magnetic recording media having such a sectional structure as shown in FIG. 7 were prepared under similar conditions of film thickness, composition and formation process to the above, except that, in the embodiment 6, the lower underlayer 12a is made of material having a bcc structure and the recording magnetic film 14 is made of Co-17 at %Cr-20 at %Pt-3 at %Ta alloy. In this case, the material having the bcc structure is Cr, Cr-50 at %V, Cr-5 at %Ti, Cr-10 at %Nb, or Cr-15 at %Mo.

As comparative samples, samples without the upper underlayer 12b were prepared. As a result of measurement of medium coercive force, such results as shown in Table 4 below were obtained. It will be observed from Table 4 that magnetic recording media having the upper underlayer 12b proposed in the present invention can have large coercive forces. When the upper underlayer 12b as in samples of Nos. 9, 10, 16, 27 and 29 is shifted from the proposed composition range of the present invention, it does not contribute to performance improvement of the magnetic recording medium so largely.

TABLE 4

Measured medium coercive forces

Unit: kOe

| | | Lower underlayer | | | | |
|---|---|---|---|---|---|---|
| No. | Upper underlayer | Cr | Cr-50at % V | Cr-5at % Ti | Cr-10at % Nb | Cr-15at % Mo |
| 1 | Co-10at % Ru | 2.5 | 2.7 | 2.6 | 2.5 | 2.7 |
| 2 | Co-20at % Ru | 2.7 | 2.7 | 2.9 | 2.8 | 2.7 |
| 3 | Co-30at % Ru | 3.4 | 3.2 | 3.1 | 3.2 | 3.1 |
| 4 | Co-35at % Ru | 3.2 | 3.4 | 3.3 | 3.2 | 3.2 |
| 5 | Co-40at % Ru | 3.1 | 3.0 | 3.1 | 3.0 | 3.1 |
| 6 | Co-50at % Ru | 2.9 | 2.9 | 3.0 | 2.8 | 2.9 |
| 7 | Co-60at % Ru | 2.7 | 2.6 | 2.8 | 3.2 | 3.0 |
| 8 | Co-65at % Ru | 2.4 | 2.4 | 2.2 | 2.0 | 2.1 |
| 9 | Co-75at % Ru | 2.3 | 2.0 | 2.1 | 2.2 | 2.3 |
| 10 | Co-85at % Ru | 2.0 | 1.9 | 1.8 | 2.1 | 2.4 |
| 11 | Co-10at % Ru-5at % Cr | 2.6 | 2.7 | 2.8 | 2.7 | 2.5 |
| 12 | Co-20at % Ru-5at % Cr | 3.3 | 3.0 | 3.1 | 3.1 | 3.6 |
| 13 | Co-30at % Ru-5at % Cr | 3.7 | 3.5 | 3.5 | 3.6 | 3.9 |
| 14 | Co-50at % Ru-5at % Cr | 3.2 | 3.4 | 3.1 | 3.2 | 3.1 |
| 15 | Co-65at % Ru-5at % Cr | 3.1 | 3.0 | 3.2 | 3.0 | 3.0 |
| 16 | Co-75at % Ru-5at % Cr | 2.4 | 2.4 | 2.4 | 2.1 | 2.2 |
| 17 | Co-30at % Ru-10at % Cr | 3.8 | 3.7 | 4.1 | 3.6 | 3.5 |
| 18 | Co-60at % Ru-10at % Cr | 3.1 | 3.0 | 3.0 | 3.0 | 3.0 |
| 19 | Co-10at % Ru-20at % Cr | 3.1 | 3.0 | 3.2 | 3.0 | 3.0 |
| 20 | Co-20at % Ru-20at % Cr | 3.3 | 3.0 | 3.2 | 3.1 | 3.2 |
| 21 | Co-40at % Ru-20at % Cr | 2.9 | 2.7 | 3.0 | 2.9 | 2.6 |
| 22 | Co-10at % Ru-30at % Cr | 3.3 | 3.2 | 3.5 | 3.0 | 3.1 |
| 23 | Co-25at % Ru-30at % Cr | 3.2 | 3.2 | 3.2 | 3.1 | 3.5 |
| 24 | Co-40at % Ru-30at % Cr | 3.0 | 3.1 | 3.3 | 3.0 | 3.1 |
| 25 | Co-5at % Ru-35at % Cr | 2.8 | 3.1 | 2.7 | 2.7 | 2.9 |
| 26 | Co-25at % Ru-35at % Cr | 3.4 | 3.6 | 3.1 | 3.5 | 3.3 |
| 27 | Co-5at % Ru-40at % Cr | 3.0 | 2.0 | 2.0 | 3.1 | 3.0 |
| 28 | Co-30at % Ru-30at % Cr | 2.7 | 3.1 | 2.9 | 2.6 | 2.8 |
| 29 | None | 2.2 | 2.0 | 1.9 | 2.1 | 2.0 |

Magnetic recording media were prepared under similar conditions to the above, except that, in the embodiment 6, the lower underlayer 12a having a B2 type crystal structure is made of FeAl, FeV, CuZn, CoAl or CuPd material. As a result of examination of improved effects of the medium coercive force and stability of the recording magnetic signal varying with time, results similar to the sixth embodiment were obtained, exhibiting the effectiveness of the present invention.

The eighth embodiment can be implemented in the following manner.

A lower underlayer 32 was made of material having an NaCl structure, an intermediate underlayer 33 was made of an ordered alloy having a B2 type crystal structure, an upper underlayer 34 was made of Co-Ru-Cr alloy and a recording magnetic film 35 was made of alloy of Co-18 at %Cr-15 at %Pt-4 at %Nb to prepare a magnetic recording medium having such a sectional structure as shown in FIG. 8. The material having the NaCl structure was MgO or LiF. Samples were prepared under similar conditions of film thickness, composition and formation process to the sixth embodiment except that the lower underlayer 32 is formed by a radio frequency sputtering method.

Prepared as comparative samples were samples (comparative example) which has no lower underlayer 32 of the NaCl structure and has the upper underlayer 34 of Co-30 at %Ru-5 at %Cr.

As a result of measurement of medium coercive forces, such results as given in Table 5 below were obtained. It will be noted from Table 5 that the magnetic recording media of the present invention have coercive forces larger than the comparative examples. When the upper underlayer 34 as in samples of Nos. 9, 10, 16 and 27 is shifted from the proposed composition range of the present invention, it does not contribute to performance improvement of the magnetic recording medium so largely.

TABLE 5

Measured Medium coercive forces

Unit: kOe

| No. | Upper underlayer | lower underlayer MgO | LiF |
|---|---|---|---|
| 1 | Co-10 at % Ru | 2.5 | 2.6 |
| 2 | Co-20 at % Ru | 2.7 | 2.7 |
| 3 | Co-30 at % Ru | 3.3 | 3.0 |
| 4 | Co-35 at % Ru | 3.2 | 3.1 |
| 5 | Co-40 at % Ru | 3.1 | 3.0 |
| 6 | Co-50 at % Ru | 2.7 | 2.9 |
| 7 | Co-60 at % Ru | 2.7 | 2.6 |
| 8 | Co-65 at % Ru | 2.5 | 2.4 |
| 9 | Co-75 at % Ru | 2.3 | 2.1 |
| 10 | Co-85 at % Ru | 2.0 | 1.9 |
| 11 | Co-10 at % Ru-5 at % Cr | 2.5 | 2.6 |
| 12 | Co-20 at % Ru-5 at % Cr | 3.1 | 3.3 |
| 13 | Co-30 at % Ru-5 at % Cr | 3.5 | 3.4 |
| 14 | Co-50 at % Ru-5 at % Cr | 3.2 | 3.0 |
| 15 | Co-65 at % Ru-5 at % Cr | 3.0 | 3.1 |
| 16 | Co-75 at % Ru-5 at % Cr | 2.2 | 2.4 |
| 17 | Co-30 at % Ru-10 at % Cr | 3.4 | 3.5 |
| 18 | Co-60 at % Ru-10 at % Cr | 3.0 | 3.1 |
| 19 | Co-10 at % Ru-20 at % Cr | 3.1 | 3.1 |
| 20 | Co-20 at % Ru-20 at % Cr | 3.1 | 2.9 |
| 21 | Co-40 at % Ru-20 at % Cr | 2.9 | 2.7 |
| 22 | Co-10 at % Ru-30 at % Cr | 3.1 | 3.0 |
| 23 | Co-25 at % Ru-30 at % Cr | 3.0 | 3.2 |
| 24 | Co-40 at % Ru-30 at % Cr | 3.0 | 3.0 |
| 25 | Co-5 at % Ru-35 at % Cr | 2.6 | 2.8 |
| 26 | Co-25 at % Ru-35 at % Cr | 3.1 | 3.0 |
| 27 | Co-5 at % Ru-40 at % Cr | 3.0 | 3.0 |
| 28 | Co-30 at % Ru-30 at % Cr | 2.8 | 2.6 |
| 29 | Co-30 at % Ru-5 at % Cr | (none) 2.0 | |

Figure 13:
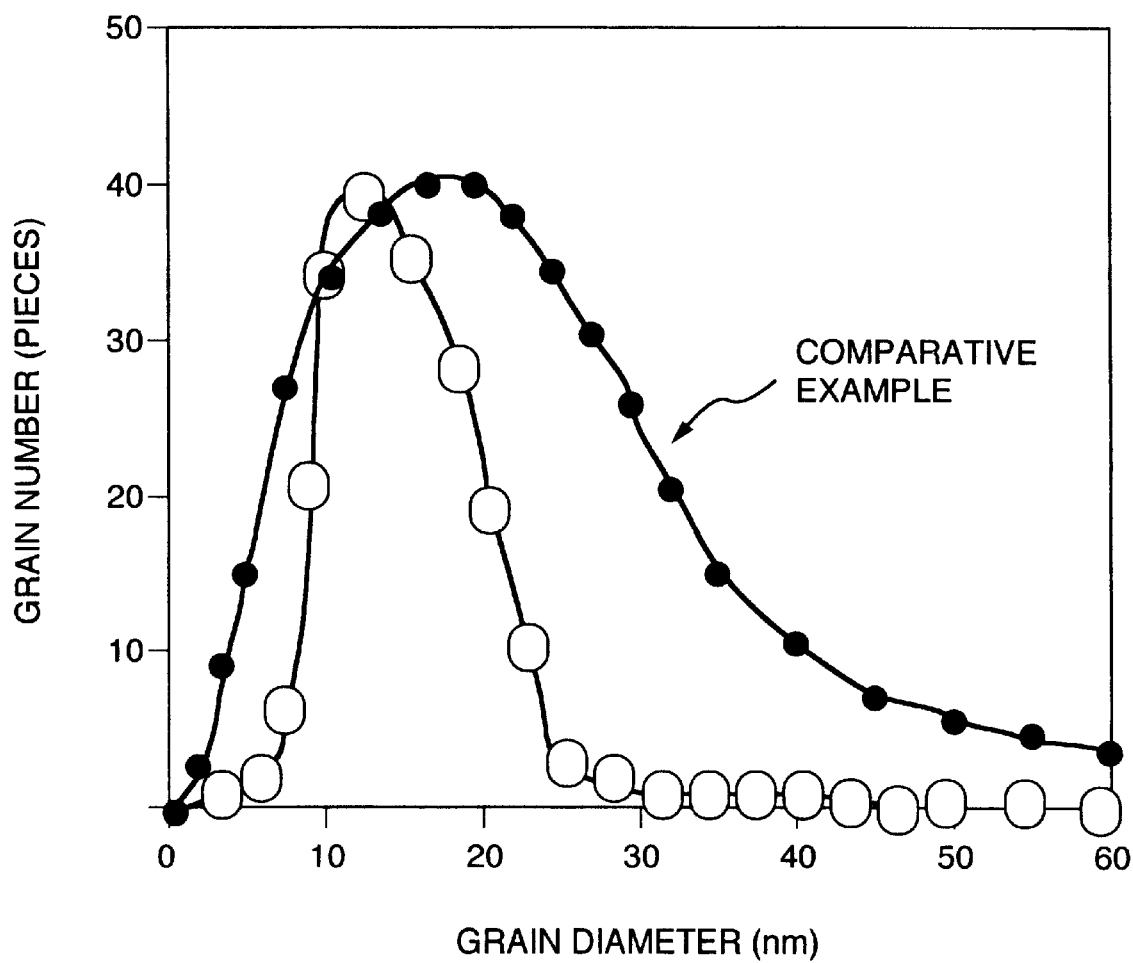
FIG. 13 shows distributions in the diameters of crystalline grains of media.

Further, a sample having the lower underlayer 32 of MgO having an NaCl structure and the upper underlayer 34 of Co-30 at %Ru-5 at %Cr provided on the lower underlayer 32 as well as a comparative example having the recording magnetic film 35 were measured with respect to their size distribution of grains. Results of measurement are shown in FIG. 13. It has been found that the sample having the lower underlayer 32 of MgO, which is narrow in grain size distribution and regular in grain size, has characteristics desirable as a high-density magnetic recording medium.

The ninth embodiment can be implemented in the following manner.

A silicon substrate having a diameter of 2.5 inches was prepared and processed by the D.C. magnetron sputtering method and by a radio frequency (RF) magnetron sputtering method to prepare a longitudinal magnetic recording medium having such a sectional structure as shown in FIG. 9. Sequentially formed on a substrate 41 were an adhesion reinforcing layer 42 of Si, Cr, Ti, Nb, Zr, Ta, Hf, $SiO_2$, $ZrO_2$, SiN, Si-25 at %Cr, Si-5 at %Ti or $SiO_2+ZrO_2$, a lower underlayer 43 of MgO, an intermediate underlayer 44 of Cr, an upper underlayer 45 of Co-20 at %Ru-15 at %Cr, a recording magnetic film 46 of Co-20 at %Cr-13 at %Pt-2 at %Nb, and a protective film 47 of carbon in this order. In this connection, the RF sputtering method was employed at the time of forming a film of the non-conductive material of $SiO_2$, SiN or $SiO_2+ZrO_2$, whereas the D.C. magnetron sputtering method was employed at the time of forming the other films. Under conditions of 3 mTorr of sputtering Ar gas pressure, 10 $W/cm^2$ of sputtering power and 280° C. of substrate temperature; the Cr adhesion reinforcing layer was formed to have a thickness of 2 nm, the lower underlayer 43 was formed to have a thickness of 5 nm, the intermediate underlayer 44 was formed to have a thickness of 10 nm, the upper underlayer 45 was formed to have a thickness of 3 nm, the magnetic film 46 was formed to have a thickness of 15 nm, and the protective film 47 was formed to have a thickness of 7 nm to thereby form a magnetic recording medium. Prepared as comparative samples were media having similar structures to the above except for no provision of the adhesion reinforcing layer 42.

Measurement of medium coercive force was carried out by the VSM and measurement of adhesion strength was carried out by an $Al_2O_3$—TiC spherical surface slider. When no peeling off in the medium is observed through 105 times of sliding operations, mark ○ was given, and when peeling off is observed, mark × was given. Measurement results are given in Table 6 below.

TABLE 6

Measurement results of medium coercive force and adhesion strength

| No. | Adhesive reinforcing layer (2 nm) | Coercive force of medium (kOe) | Adhesion strength |
|---|---|---|---|
| 1 | Si | 2.6 | ○ |
| 2 | Cr | 2.7 | ○ |
| 3 | Ti | 2.6 | ○ |
| 4 | Nb | 2.8 | ○ |
| 5 | Zr | 2.9 | ○ |
| 6 | Hf | 3.1 | ○ |
| 7 | $SiO_2$ | 2.7 | ○ |
| 8 | $ZrO_2$ | 3.3 | ○ |
| 9 | Si-25 at % Cr | 3.2 | ○ |
| 10 | Si-5 at % Ti | 3.3 | ○ |
| 11 | $SiO_2 + ZrO_2$ | 2.7 | ○ |
| 12 | None (Comparison example) | 2.6 | × |

Upper underlayer: MgO (5 nm)
Intermediate underlayer: Cr (10 nm)
Upper underlayer: Co-20 at %Cr-13 at %Pt-2 at %Nb (3 nm)
Magnetic film: Co-20 at %Ru-15 at %Cr (15 nm)

What is claimed is:

1. A magnetic recording medium comprising:
a substrate;
an underlayer provided on the substrate;
a Co alloy magnetic film formed through the underlayer; and
a protective film for protecting said magnetic film,
wherein said underlayer has a two-layer structure of a lower underlayer contacted with the substrate and an upper underlayer contacted with the Co alloy magnetic film,
said upper underlayer consists of a Co—$Cr_x$—$M_y$ alloy film having a hexagonal close-packed structure, where 25 atomic %≦x+y≦50 atomic %, 0.5 atomic %≦y, and nonmagnetic element M is an element selected from the group consisting of B, Si, Ge, C, P, V, Nb, Hf, Mn, Rh, Os, Ir, Re, Pd, and Pt,
said lower underlayer includes a material having a B2 structure, and
said magnetic film is made of Co alloy material of a hexagonal close-packed structure containing Pt by an amount not smaller than 5 atomic % and not larger than 30 atomic %.

2. A magnetic recording medium as set forth in claim 1, wherein said lower underlayer includes a material having a B2 crystal structure selected from the group consisting of NiAl, FeAl, FeV, CuZn, CoAl and CuPd.

3. A magnetic recording medium as set forth in claim 1, wherein said lower underlayer includes a material having a body-centered cubic structure selected from the group consisting of Cr, Cr—Ti, Cr—Mo, Cr—W, Cr—Nb and Cr—V.

4. A magnetic recording medium comprising:
a substrate;
a Co alloy magnetic film formed on the substrate through an underlayer; and
a protective film,
wherein said underlayer has a two-layer structure of a lower underlayer provided closer to said substrate and an upper underlayer provided closer to the magnetic film,
said lower underlayer is an ordered alloy layer having a B2 crystal structure,
said upper underlayer consists of alloy material of Co—$Ru_x$—$Cr_y$ (5 atomic %≦x≦65 atomic %, 35 atomic %≧y≧5 atomic %) having a hexagonal close-packed structure, and
said magnetic film is made of Co alloy material of a hexagonal close-packed structure containing Pt by an amount not smaller than 5 atomic % and not larger than 30 atomic %.

5. A magnetic recording medium as set forth in claim 4, wherein said ordered alloy layer having the B2 crystal structure is made of material selected from the group consisting of NiAl, FeAl, FeV, CuZn, CoAl and CuPd.

6. A magnetic recording medium according to claim 4, wherein said lower underlayer includes a coated structure made of a material having a B2 crystal structure and a material having a body-centered cubic structure.

7. A magnetic recording medium comprising:
a substrate;
a Co alloy magnetic film formed on the substrate through an underlayer; and
a protective film,
wherein said underlayer has a two-layer structure of a lower underlayer provided closer to said substrate and an upper underlayer provided closer to the magnetic film,
said lower underlayer is a metal film having a body-centered cubic structure,
said upper underlayer consists of alloy material of Co—$Ru_x$—$Cr_y$ (5 atomic %≦x≦65 atomic %, 35 atomic %≧y≧5 atomic %) having a hexagonal close-packed structure, and
said magnetic film is made of Co alloy material of a hexagonal close-packed structure containing Pt by an amount not smaller than 5 atomic % and not larger than 30 atomic %.

8. A magnetic recording medium as set forth in claim 7, wherein said metal film having the body-centered cubic structure is made of material selected from the group of Cr, Cr—Ti, Cr—Mo, Cr—Nb and Cr—V.

9. A magnetic recording medium comprising:
a substrate;
a Co alloy magnetic film formed on the substrate through an underlayer; and
a protective film,
wherein said underlayer has a three-layer structure of lower, intermediate and upper underlayers provided sequentially from a side closer to the substrate,
said lower underlayer is made of MgO or LiF,
said intermediate underlayer is one of an ordered alloy layer having a B2 crystal structure, a nonmagnetic film having a body-centered cubic structure, and a coated film made up of the ordered alloy layer and the nonmagnetic film having a body centered cubic structure,
said upper underlayer consists of alloy material of Co—$Ru_x$—$Cr_y$ (5 atomic %≦x≦65 atomic %, 35 atomic %≧y≧5 atomic %) having a hexagonal close-packed structure, and
said magnetic film is made of Co alloy material of a hexagonal close-packed structure containing Pt by an amount not smaller than 5 atomic % and not larger than 30 atomic %.

10. A magnetic recording medium as set forth in claim 9, wherein an adhesion reinforcing layer made of Si, Cr, Ti, Nb, Zr, Hf, Ta, SiOx, $Zro_2$, SiN or an alloy containing these is provided between said substrate and said lower underlayer.

11. A magnetic recording medium as set forth in claim 9, wherein said upper underlayer has a thickness not smaller than 1 nm and not larger than 50 nm.

12. A magnetic recording medium according to claim 4, wherein said upper underlayer is of a non-magnetization or saturation magnetization of 30 emu/cc or less.

13. A magnetic recording medium according to claim 7, wherein said upper underlayer is of a non-magnetization or saturation magnetization of 30 emu/cc or less.

14. A magnetic recording medium according to claim 9, wherein said upper underlayer is of a non-magnetization or saturation magnetization of 30 emu/cc or less.

* * * * *